US012784166B2

(12) United States Patent
Hana et al.

(10) Patent No.: US 12,784,166 B2
(45) Date of Patent: Nov. 3, 2026

(54) CRACK INSPECTION DEVICE, CRACK INSPECTION SYSTEM, AND CRACK INSPECTION METHOD

(71) Applicant: Mitsubishi Electric Corporation, Tokyo (JP)

(72) Inventors: Norihiko Hana, Tokyo (JP); Masaki Umeda, Tokyo (JP); Go Kajiwara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 267 days.

(21) Appl. No.: 18/834,231

(22) PCT Filed: Feb. 8, 2022

(86) PCT No.: PCT/JP2022/004878
§ 371 (c)(1),
(2) Date: Jul. 30, 2024

(87) PCT Pub. No.: WO2023/152793
PCT Pub. Date: Aug. 17, 2023

(65) Prior Publication Data
US 2025/0131549 A1 Apr. 24, 2025

(51) Int. Cl.
*G06T 7/00* (2017.01)

(52) U.S. Cl.
CPC .. *G06T 7/0002* (2013.01); *G06T 2207/20081* (2013.01)

(58) Field of Classification Search
CPC .................... G06T 7/0002; G06T 7/001; G06T 2207/20076; G06T 2207/30164; G06T 2207/20081; G01B 21/00
See application file for complete search history.

(56) References Cited

U.S. PATENT DOCUMENTS 9,513,200 B1 * 12/2016 Dubke .................... G01N 3/20
2010/0116062 A1 * 5/2010 Sato .................... G01M 5/0033
73/799

(Continued)

FOREIGN PATENT DOCUMENTS

JP 2002-286444 A 10/2002
JP 2010-197377 A 9/2010

(Continued)

OTHER PUBLICATIONS

International Search Report and Written Opinion mailed on Apr. 26, 2022, received for PCT Application PCT/JP2022/004878, filed on Feb. 8, 2022, 8 pages including English Translation.

(Continued)

*Primary Examiner* — Syed Haider
(74) *Attorney, Agent, or Firm* — XSENSUS LLP

(57) ABSTRACT

A controlling circuitry: generates a shape model of a pipe, set a crack occurrence plane in an inner surface of the pipe and set a measurement plane on the basis of the shape model imparted with a boundary condition including pressure information applied to the inner surface of the pipe, performs control in which a change on the measurement plane when a crack has occurred at the crack occurrence plane is set as a measurement plane estimated change vector, for each of crack candidates; derives deformation on the measurement plane as a measurement plane deformation vector, and calculates a similarity between the derived measurement plane deformation vector and the measurement plane estimated change vector for each crack candidate; and estimate a crack from the similarity and a state quantity deformation vector indicating a deformation state on the crack occurrence plane for each crack candidate.

20 Claims, 32 Drawing Sheets

(56) References Cited

U.S. PATENT DOCUMENTS

| | | | | |
|---|---|---|---|---|
| 2015/0330551 | A1* | 11/2015 | Van Nie | F16L 55/18<br>73/592 |
| 2018/0052117 | A1* | 2/2018 | Imai | G01B 11/30 |
| 2018/0356371 | A1* | 12/2018 | Giese | G01N 29/225 |
| 2019/0331301 | A1* | 10/2019 | Du | G01N 33/42 |
| 2022/0113260 | A1 | 4/2022 | Ishii | |
| 2022/0221429 | A1* | 7/2022 | Popov | G01N 29/043 |
| 2023/0251170 | A1 | 8/2023 | Hana et al. | |

FOREIGN PATENT DOCUMENTS

| | | | |
|---|---|---|---|
| JP | 6789452 | B1 | 11/2020 |
| WO | 2019/176464 | A1 | 9/2019 |
| WO | 2020/157973 | A1 | 8/2020 |
| WO | 2022/059080 | A1 | 3/2022 |

OTHER PUBLICATIONS

Apalkov et al., "Geometrical identification of invisible defects in structural elements basing on digital image correlation data", IOP Conf. Series: Materials Science and Engineering vol. 709, No. 033038, 2020, pp. 1-6.

Action issued Nov. 12, 2024 in Japanese Patent Application No. 2023-579887, 6 pages.

* cited by examiner

CRACK INSPECTION DEVICE, CRACK INSPECTION SYSTEM, AND CRACK INSPECTION METHOD

CROSS-REFERENCE TO RELATED APPLICATION

This application is a national stage application, pursuant to 35 U.S.C. § 371, of International Patent Application No. PCT/JP2022/004878, filed Feb. 8, 2022, the entire contents of which are incorporated herein by reference.

TECHNICAL FIELD

The present disclosure relates to a crack inspection device, a crack inspection system, and a crack inspection method.

BACKGROUND ART

If a crack occurs inside a pipe for sending a fluid, it is difficult to perform inspection for recognizing the state of the crack because the inside cannot be viewed or directly measured. As a result, the fluid such as liquid, gas, or powder flowing inside the pipe might leak from the pipe through the crack. If the fluid leaks from the pipe during operation of a device to which the pipe is connected, it is necessary to stop the device, to perform inspection and repair. Thus, a period in which the device cannot be used arises besides a plan.

In order to solve such a problem, disclosed is an inspection device as a crack inspection device which inspects the state of a crack inside a structural body on the basis of an image of the outer surface of the structural body, as shown below.

That is, the conventional inspection device includes: an acquisition unit which acquires a plurality of images of an outer surface of a structural body captured at times different from each other while a load applied to the structural body is being changed, the images each including at least a part of a fissure; a displacement calculation unit which calculates displacement in a first local area on one side of the fissure as a boundary on the outer surface of the structural body, and displacement in a second local area on the other side, on the basis of the plurality of images; and an estimation unit which estimates the state of the fissure inside the structural body on the basis of the displacement in the first local area and the displacement in the second local area (see, for example, Patent Document 1).

CITATION LIST

Patent Document

Patent Document 1: Japanese Laid-Open Patent Publication No. WO2019/176464

SUMMARY OF THE INVENTION

Problem to be Solved by the Invention

In the conventional inspection device, the displacement calculation unit calculates displacement in the first local area on one side of the fissure as a boundary and displacement in the second local area on the other side, and the state of the crack inside the structural body is estimated on the basis of the displacement in the first local area and the displacement in the second local area.

However, normally, a pipe for sending a fluid has a complicated structural shape having a branch path and the like for sending a desired amount of fluid to a desired location, and moreover, a pressure change or the like occurs in the sent fluid. Thus, crack states such as an occurrence position and a size of a crack inside a pipe are changed, and therefore it is difficult to estimate the state of a crack inside a pipe accurately by the above estimation method.

The present disclosure has been made to solve the above problem, and an object of the present disclosure is to provide a crack inspection device, a crack inspection system, and a crack inspection method that can accurately estimate a crack inside a pipe for sending a fluid.

Means to Solve the Problem

A crack inspection device according to the present disclosure includes: a measurement unit which measures deformation on an outer surface of a pipe for sending a fluid; and a control unit which estimates a crack in an inner surface of the pipe on the basis of a measurement value from the measurement unit. The control unit generates a shape model that models a shape of the pipe, on the basis of structure information indicating a structure of the pipe. On the basis of the shape model, the control unit performs first setting control in which a part where a crack occurs in the inner surface of the pipe is specified and an area including the part is set as a crack occurrence plane, and performs second setting control in which an area on the outer surface of the pipe where deformation will occur when a crack has occurred at the crack occurrence plane is specified and the area is set as a measurement plane. On the basis of the shape model imparted with a boundary condition including first pressure information about a pressure applied to the inner surface of the pipe by the fluid, the control unit performs third setting control in which a change on the measurement plane when a crack has occurred at the crack occurrence plane is set as a measurement plane estimated change vector, for each of a plurality of kinds of crack candidates. The control unit derives deformation on the measurement plane as a measurement plane deformation vector on the basis of the measurement value from the measurement unit, calculates a similarity between the derived measurement plane deformation vector and the measurement plane estimated change vector for each crack candidate, and normalizes the similarity. The control unit performs first estimation control in which a crack occurring at the crack occurrence plane is estimated from the normalized similarity and a state quantity deformation vector indicating a deformation state on the crack occurrence plane for each crack candidate.

A crack inspection system according to the present disclosure includes: a measurement unit which acquires, as measurement values, image information obtained by capturing deformation on an outer surface of a pipe, and at least one of pressure information about a pressure applied to the pipe, displacement information of the pipe, or temperature information of the pipe; a storage unit which stores the acquired measurement values; a control unit which estimates a crack in an inner surface of the pipe, using a measurement plane deformation vector indicating deformation of the pipe and derived on the basis of the stored image information, and at least one stored measurement value of the pressure information, the displacement information, or the temperature information; and a display unit which displays the crack estimated by the control unit.

Another crack inspection system according to the present disclosure includes: the crack inspection device configured as described above; a display unit which displays a result of control performed by the control unit of the crack inspection device; and a storage unit which stores the measurement value from the measurement unit. The measurement unit acquires, as the measurement values, image information obtained by capturing deformation on an outer surface of the pipe, and at least one of pressure information about a pressure applied to the pipe, displacement information of the pipe, or temperature information of the pipe. The control unit stores the acquired measurement values in the storage unit. In the first estimation control, the control unit estimates the crack, using the measurement plane deformation vector of the pipe derived on the basis of the stored image information, and at least one stored measurement value of the pressure information, the displacement information, or the temperature information. The control unit displays the estimated crack on the display unit.

A crack inspection method according to the present disclosure is a crack inspection method in a crack inspection device including a measurement unit which measures deformation on an outer surface of a pipe for sending a fluid, and a control unit which estimates a crack in an inner surface of the pipe on the basis of a measurement value from the measurement unit, the crack inspection method including: a model generation step of generating a shape model that models a shape of the pipe, on the basis of structure information indicating a structure of the pipe; a step of, on the basis of the shape model, performing first setting control in which a part where a crack occurs in the inner surface of the pipe is specified and an area including the part is set as a crack occurrence plane, and performing a second setting step in which an area on the outer surface of the pipe where deformation will occur when a crack has occurred at the crack occurrence plane is specified and the area is set as a measurement plane; a third setting step of, on the basis of the shape model imparted with a boundary condition including first pressure information about a pressure applied to the inner surface of the pipe by the fluid, setting a change on the measurement plane when a crack has occurred at the crack occurrence plane, as a measurement plane estimated change vector, for each of a plurality of kinds of crack candidates; a step of deriving deformation on the measurement plane as a measurement plane deformation vector on the basis of the measurement value from the measurement unit, calculating a similarity between the derived measurement plane deformation vector and the measurement plane estimated change vector for each crack candidate, and normalizing the similarity; and a first estimation step of estimating a crack occurring at the crack occurrence plane, from the normalized similarity and a state quantity deformation vector indicating a deformation state on the crack occurrence plane for each crack candidate.

Effect of the Invention

The crack inspection device and the crack inspection method according to the present disclosure can accurately estimate a crack inside a pipe for sending a fluid.

The crack inspection system according to the present disclosure can provide an accurately estimated crack to a worker, thus achieving appropriate maintenance work for a pipe.

DESCRIPTION OF EMBODIMENTS

Embodiment 1

Figure 1:
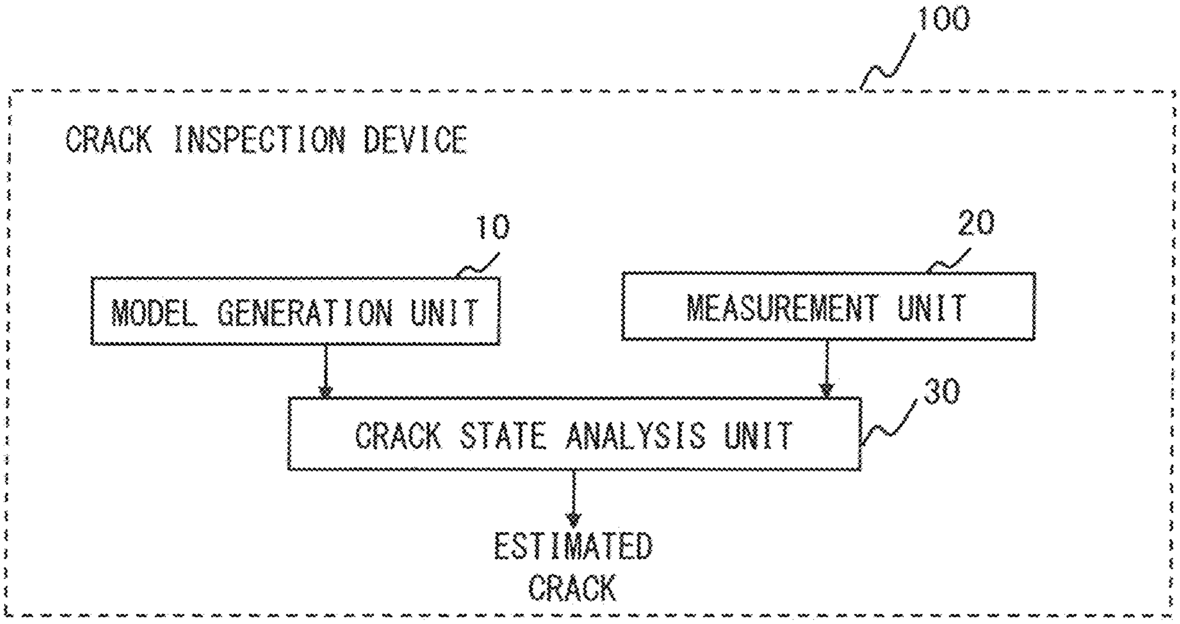
FIG. 1 is a block diagram showing a basic configuration of a crack inspection device according to embodiment 1.

Hereinafter, a crack inspection device 100 and a crack inspection method for inspecting a crack of a pipe 40 according to the present embodiment will be described with reference to the drawings. In the drawings, the same reference characters denote the same or corresponding parts.

The crack inspection device 100 of the present embodiment inspects a crack that occurs on the inner side of the pipe 40 for sending a fluid such as liquid, gas, and powder.

FIG. 1 is a block diagram showing a basic configuration of the crack inspection device 100 according to embodiment 1.

Figure 2:
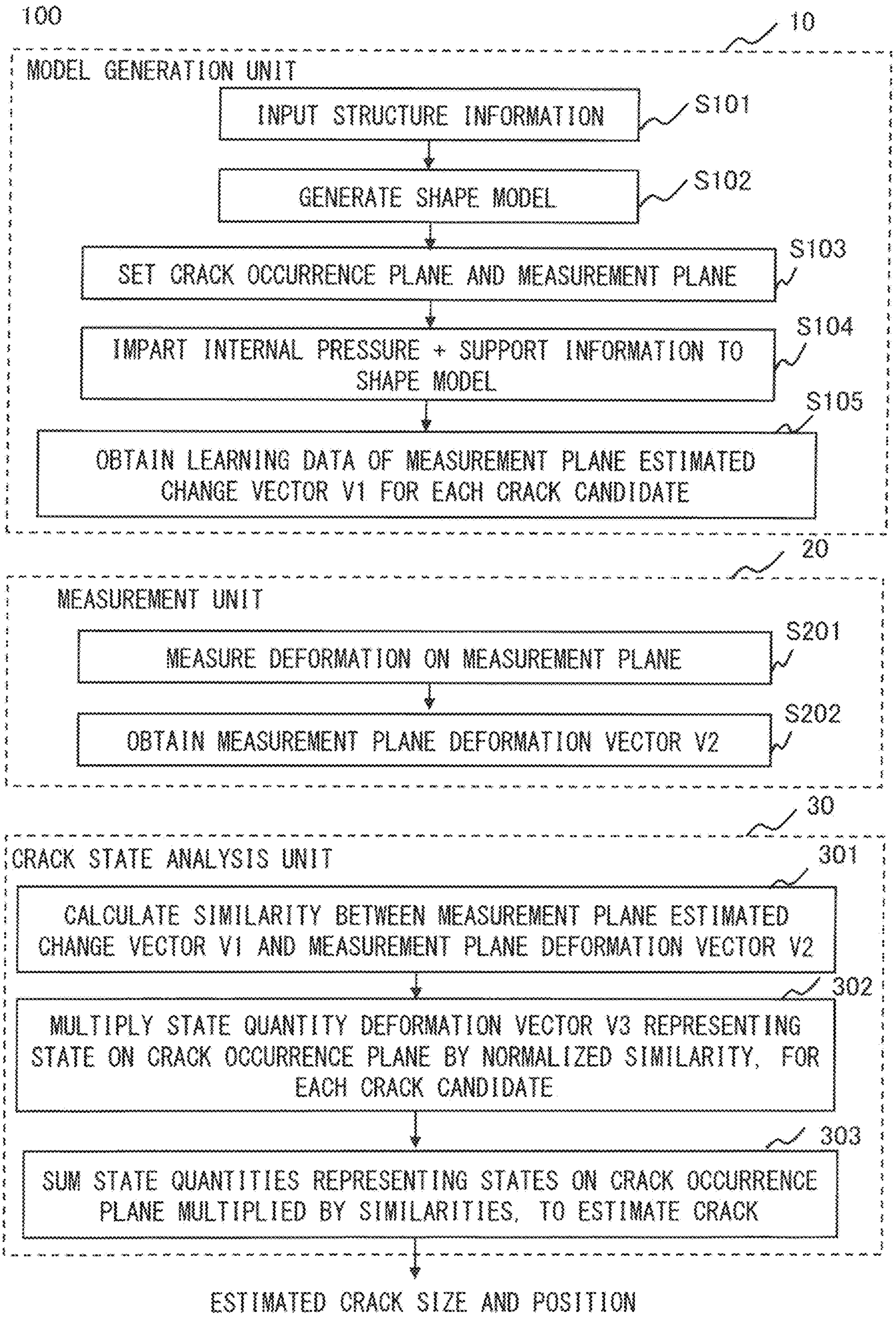
FIG. 2 is a flowchart schematically showing a crack inspection method in the crack inspection device according to embodiment 1.

FIG. 2 is a flowchart schematically showing the crack inspection method in the crack inspection device 100 according to embodiment 1.

Figure 3:
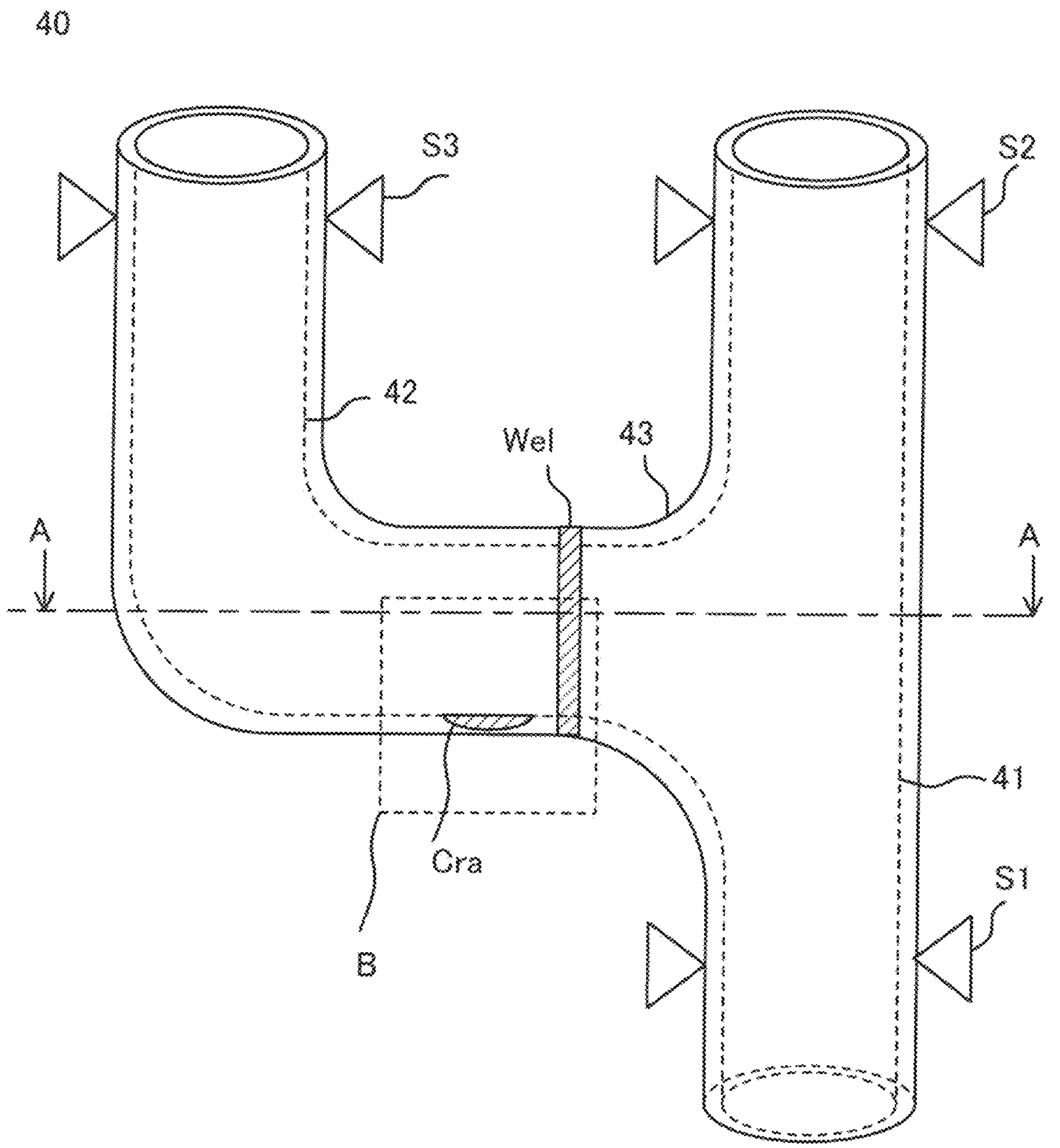
FIG. 3 shows a structure of a pipe that is an inspection target of the crack inspection device according to embodiment 1.

FIG. 3 shows a structure of the pipe 40 that is an inspection target of the crack inspection device 100 according to embodiment 1.

Figure 4:
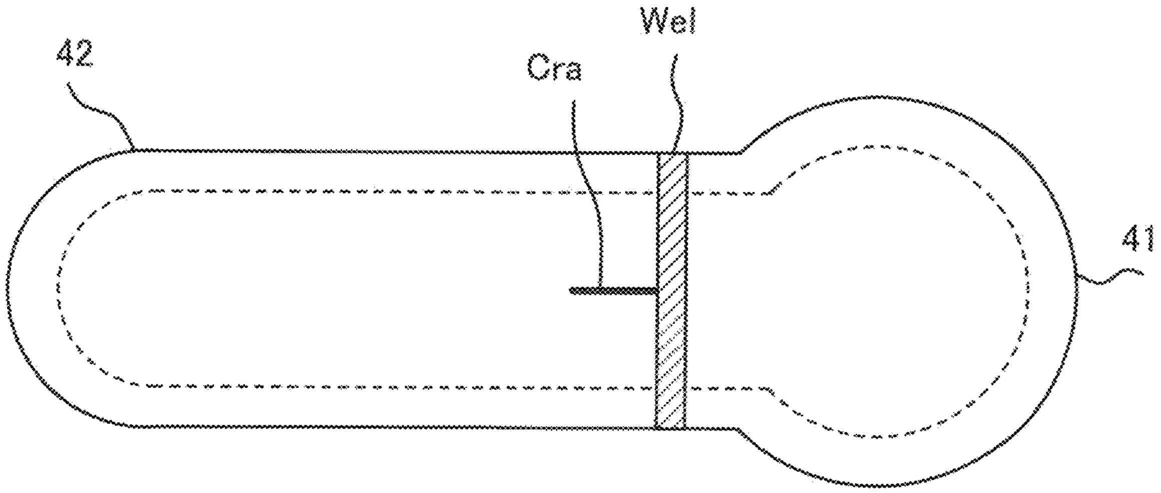
FIG. 4 shows a structure of a pipe that is an inspection target of the crack inspection device according to embodiment 1.

FIG. 4 is a sectional view along line A-A, of the pipe 40 shown in FIG. 3.

Figure 5:
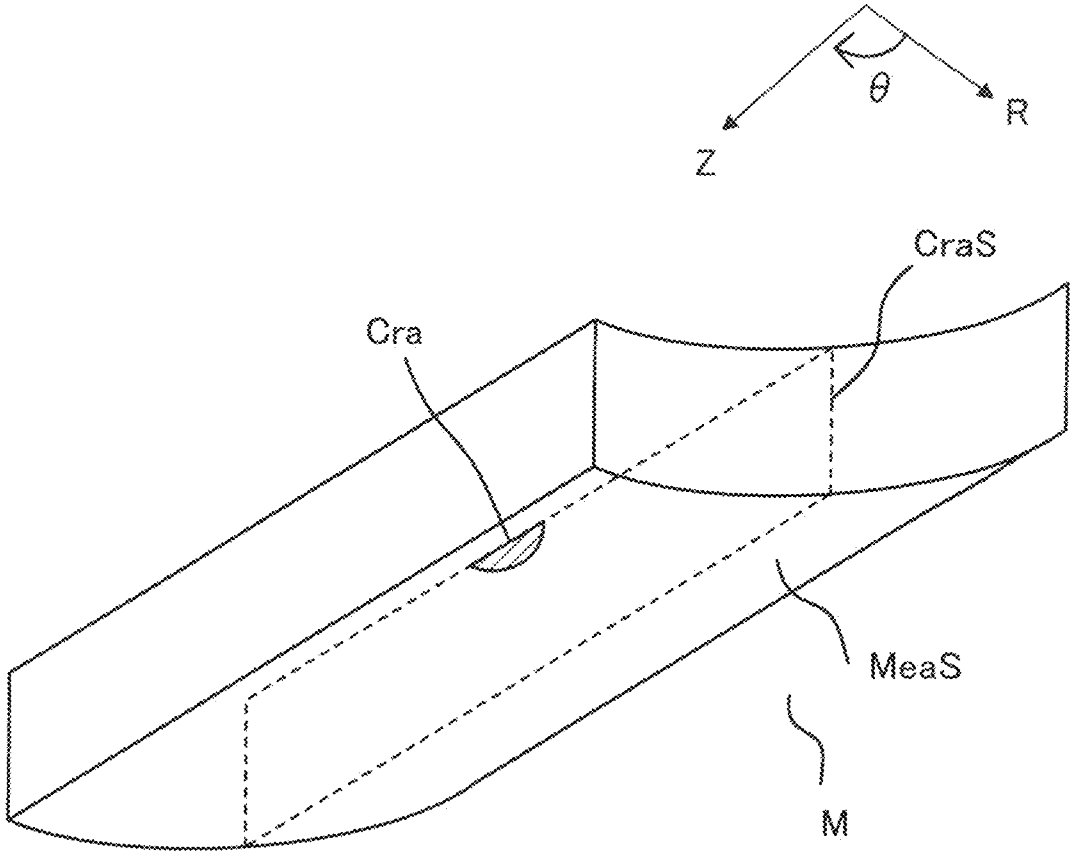
FIG. 5 is a perspective view showing a shape model that models the shape of a pipe, according to embodiment 1.

FIG. 5 is a perspective view showing a shape model M that models the shape of the pipe 40 that is an inspection target of the crack inspection device 100 according to embodiment 1.

First, with reference to FIG. 3, the pipe 40 that is an inspection target will be described.

FIG. 3 shows an example of the structure of the pipe 40 that is an inspection target, and the pipe 40 has such a structure that a straight pipe 41 having a branch 43 for branching the fluid and an L-shaped pipe 42 having an L shape are joined by being welded at a welding portion We1.

The straight pipe 41 is supported by support portions S1, S2 of a jig or the like, and the L-shaped pipe 42 is supported by a support portion S3 of a jig or the like.

Here, a crack Cra occurs inside the L-shaped pipe 42, due to welding failure at the welding portion We1 connecting the L-shaped pipe 42 and the straight pipe 41, or erosion, corrosion, or the like occurring at the L-shaped pipe 42 near the branch 43 in a case where a liquid flows in the pipe 40.

The crack Cra progresses due to a pressure applied to the pipe 40, and the fluid such as liquid, gas, or powder in the pipe 40 leaks out of the pipe 40 through the crack Cra. As another example, the pipe 40 might be broken at the part where the crack Cra is present, when an excessive pressure is applied. The crack Cra is inspected by the crack inspection device 100 of the present embodiment.

Hereinafter, the crack inspection device 100 will be described.

As shown in FIG. 1, the crack inspection device 100 includes a model generation unit 10 as a control unit, a measurement unit 20, and a crack state analysis unit 30 as the control unit, and estimates the state of the crack Cra. The state of the crack Cra to be estimated is the size, the shape, the position, or the like of the crack Cra.

The crack state analysis unit 30 is connected to the model generation unit 10 and the measurement unit 20 via communication lines or the like, and can receive data outputted from the model generation unit 10 and the measurement unit 20.

Hereinafter, with reference to FIG. 2, the outlines of controls in the model generation unit 10, the measurement unit 20, and the crack state analysis unit 30 will be described.

First, the model generation unit 10 will be described.

The model generation unit 10 generates a shape model M that models the shape of the pipe 40, on the basis of design information inputted from the outside or structure information about the pipe 40 obtained through actual measurement (step S101 to step S102, model generation step).

Here, the structure information is the inner diameter of the pipe 40, the outer diameter thereof, a pipe end shape thereof, a welding shape thereof, a welding position thereof, a welding method therefor, support information regarding means such as a jig for fixing a set part of the pipe 40, a support method therefor, and the like.

Next, on the basis of the shape model M, the model generation unit 10 performs first setting control Se1 in which a part where there is a possibility that the crack Cra occurs in an inner surface of the pipe 40 is specified and a set area in the pipe 40 including the part where there is a possibility that the crack Cra occurs is set as a crack occurrence plane CraS (first setting step). In addition, on the basis of the shape model M, the model generation unit 20 performs second setting control Se2 in which an area on the outer surface of the pipe 40 where deformation will occur when the crack Cra has occurred at the crack occurrence plane CraS is specified and the area is set as a measurement plane MeaS (step S103, second setting step).

Next, the model generation unit 10 imparts first pressure information P1 which is an internal pressure applied in the pipe 40 by the sent fluid and the structure information such as support information about the pipe 40, as a boundary condition, to the shape model M (step S104).

Here, the boundary condition is a condition set for the shape model to be subjected to structural analysis. The boundary condition includes a load condition and a constraint condition. As the load condition, where and at what level a load is applied to the structural body, i.e., vector information for a force at a part where a load is applied in the shape model, is defined. Meanwhile, as the constraint condition, information such as a support method about where and how the structural body is supported is defined.

Next, on the basis of the shape model M imparted with the boundary condition including the first pressure information P1 which is the internal pressure applied to the inner surface of the pipe 40 by the fluid, the model generation unit 10 performs third setting control Se3 in which a change on the measurement plane MeaS when the crack Cra has occurred at the crack occurrence plane CraS is set as a measurement plane estimated change vector V1, for each of a plurality of kinds of crack candidates (step S105, third setting step).

The plurality of kinds of crack candidates are candidate information for the crack Cra to be estimated, having different shapes and different positions.

Next, the outline of control in the measurement unit 20 will be described.

The measurement unit 20 measures deformation on the measurement plane MeaS at the outer surface of the pipe 40 that occurs in accordance with presence of the crack Cra (step S201). The measurement unit 20 has a control unit (not shown) and calculates deformation on the measurement plane MeaS as a measurement plane deformation vector V2 on the basis of an acquired measurement value (step S202).

Here, the case where the control unit (not shown) of the measurement unit 20 calculates the measurement plane deformation vector V2 on the basis of the measurement value has been shown, but the present disclosure is not limited thereto. The measurement plane deformation vector V2 representing deformation on the measurement plane may be calculated by, for example, the crack state analysis unit 30 described below, on the basis of the measurement value from the measurement unit 20.

Next, the outline of control of the crack state analysis unit 30 will be described.

On the basis of the measurement plane estimated change vector V1 which is learning data obtained from the model generation unit 10 and the measurement plane deformation vector V2 acquired by the measurement unit 20, the crack state analysis unit 30 calculates a similarity between the measurement plane estimated chance vector V1 and the measurement plane deformation vector V2 (step S301).

The crack state analysis unit 30 multiplies a state quantity deformation vector V3 representing the state on the crack occurrence plane CraS by a normalized similarity, for each crack candidate (step S302).

Next, the crack state analysis unit 30 sums the state quantity deformation vectors V3 representing the states on the crack occurrence plane CraS multiplied by the similarities, to estimate a crack (step S303).

Thus, information about the size, the shape, and the position of the estimated crack Cra is obtained.

The process for estimating a crack through steps S301 to S303 is referred to as first estimation control Es1 (first estimation step). The details of the first estimation control Es1 will be described later.

Hereinafter, the shape model M of the pipe 40 generated by the model generation unit 10 will be described.

The shape model M shown in FIG. 5 is generated from a range indicated by B in FIG. 3.

The crack occurrence plane CraS as a candidate plane is set inside the shape model M, and the measurement plane MeaS is set at the outer surface of the shape model M.

In FIG. 5, a flat plate that is the shape model M is represented in a cylindrical coordinate system, a plane on which the measurement plane MeaS is set is a θz plane, and a plane on which the crack occurrence plane CraS as a candidate plane is set is an RZ plane.

As described above, the crack occurrence plane CraS as a candidate plane is set at a part where the crack Cra is assumed to occur. The measurement plane MeaS is set in a range where the outer surface of the shape model M changes due to change on the candidate plane.

As described above, instead of the entire structure of the pipe 40, the partial range B of the pipe 40 shown in FIG. 3 is cut out in the θ direction, to be modeled as the shape model M.

As described above with reference to FIG. 2, in step 104 by the model generation unit 10 shown in FIG. 2, the first pressure information P1 which is the internal pressure applied to the pipe 40 by the fluid and the structure information such as the support method in the circumferential direction of the pipe 40 are imparted as a boundary condition to the shape model M. At this time, the entire structure of the pipe 40 as shown in FIG. 3 may be modeled, displacements around the shape model M of the pipe 40 when the internal pressure is applied may be calculated with a support condition by the support portions S1, S2, S3 imparted, and the calculated displacements may be imparted as a support condition for the shape model M, in the boundary condition.

Thus, the outline of control in the model generation unit 10 has been described with reference to FIG. 2. Hereinafter, the details of control in the model generation unit 10 by numerical analysis will be described.

Figure 6:
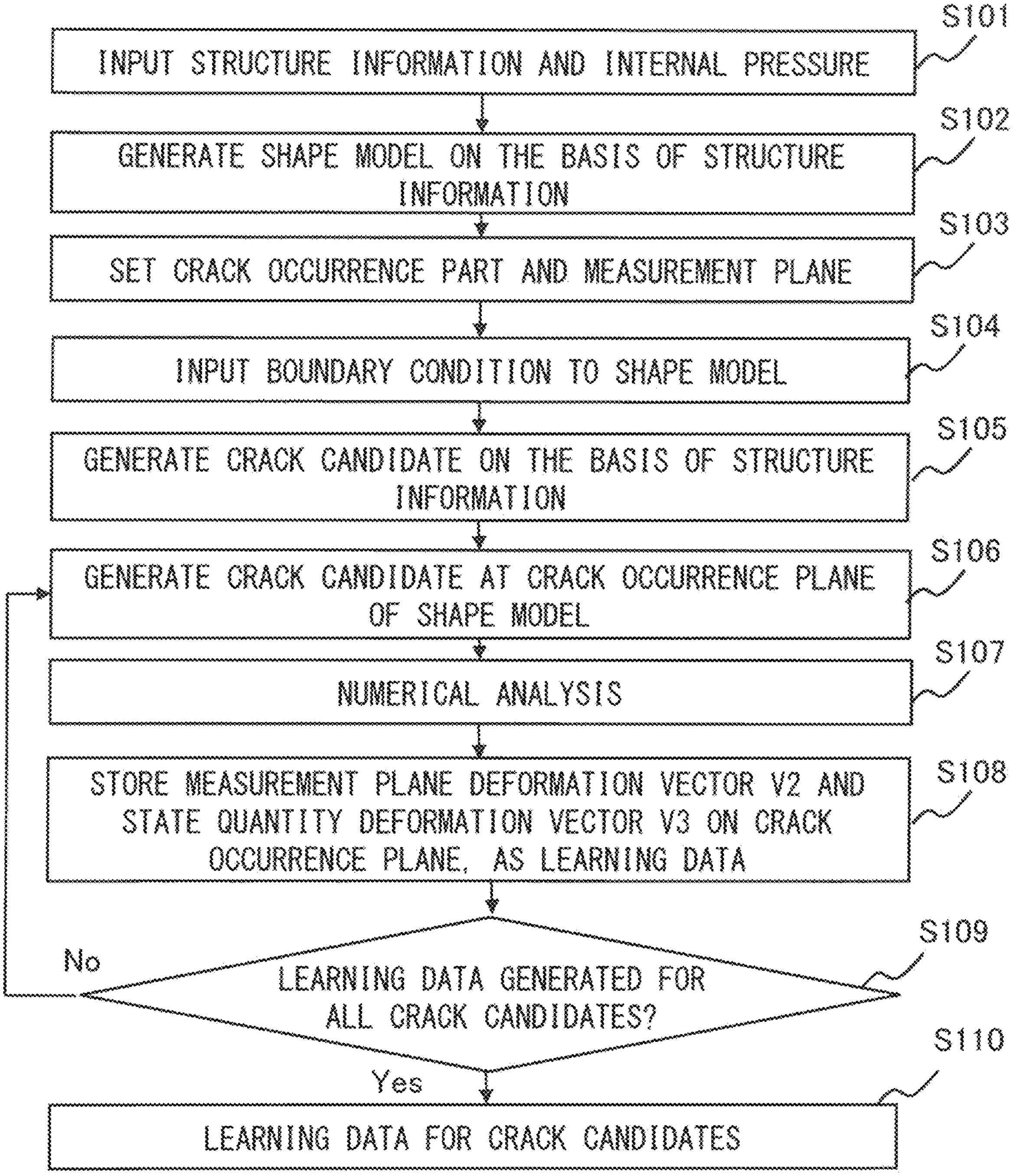
FIG. 6 is a flowchart showing the details of control in a model generation unit according to embodiment 1.

FIG. 6 is a flowchart showing the detailed process of control in a case where the model generation unit 10 according to embodiment 1 is configured using numerical analysis. In FIG. 6, the steps already shown in FIG. 2 are denoted by the same reference characters.

In step S101, as structure information indicating the structure of the pipe, at least one of the inner diameter of the pipe 40, the outer diameter thereof, an end shape thereof, a welding shape thereof, a welding position thereof, a support method for fixing a set part of the pipe 40, and a support position, is inputted. In addition, in step S101, the first pressure information P1 which is the internal pressure applied to the pipe 40 is inputted.

In step S102, a numerical analysis model for generating learning data is generated on the basis of the structure information. Here, the numerical analysis model is the shape model M of the pipe 40 shown in FIG. 3.

In step S103, it is assumed that a crack occurs in the shape model M of the pipe 40 due to failure of the welding portion We1, and the crack occurrence plane CraS as a candidate plane and the measurement plane MeaS are set near the welding portion We1 of the shape model M.

In step S104, a boundary condition generated from the structure information such as the support method for the pipe 40 and the first pressure information P1 which is the internal pressure applied to the pipe 40 are inputted to the shape model M.

In step S105, a shape of a crack candidate to be generated is determined on the basis of the structure information of the pipe 40. Hereinafter, an example of setting of the shape of the crack candidate will be shown.

Figure 7:
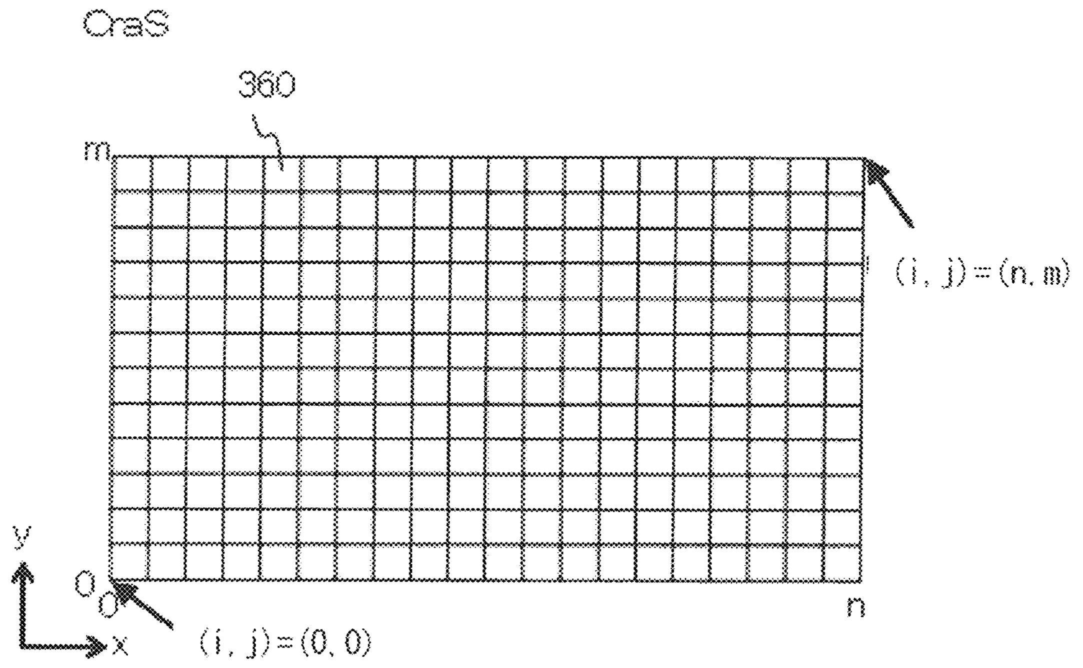
FIG. 7 shows a state in which a crack occurrence plane of a pipe is divided into elements, according to embodiment 1.

FIG. 7 shows a state in which the crack occurrence plane CraS as a candidate plane in FIG. 4 is divided into elements 360 by parallel lines. The crack occurrence plane CraS as a candidate plane is divided into n pieces in the x-axis direction and m pieces in the y-axis direction, and each point at which parallel lines dividing the plane in a grid form intersect each other, i.e., each vertex of the divided grid squares, is indicated as a position (i, j). The position (i, j) is represented by numerical values from (0, 0) to (n, m). Where the vertices at intersections are defined as nodes, the nodes are points located on the lines forming the elements 360. In FIG. 7, the elements 360 are shown as squares, but without limitation thereto, the elements 360 may be trapezoids, for example.

Structure analysis for the crack occurrence plane is performed at each position of the nodes on the crack occurrence plane. For example, in a case where a crack has occurred at the node at the position (0, 0) on the crack occurrence plane, structure analysis is performed for displacement changes at all the nodes on the crack occurrence plane from the position (0, 0) to the position (n, m) on the crack occurrence plane. In this case, the node at the position (0, 0) corresponds to the crack and therefore is a void. Thus, a displacement change does not occur at the position (0, 0). On the other hand, since it is assumed that there are no cracks at the nodes at the positions other than (0, 0), displacement changes occur at these nodes, depending on the boundary condition. Since structure analysis for a displacement change on the crack occurrence plane is performed on a node position basis as described above, the number of learning data is decreased, so that a generation period for the learning data is shortened.

Figure 8:
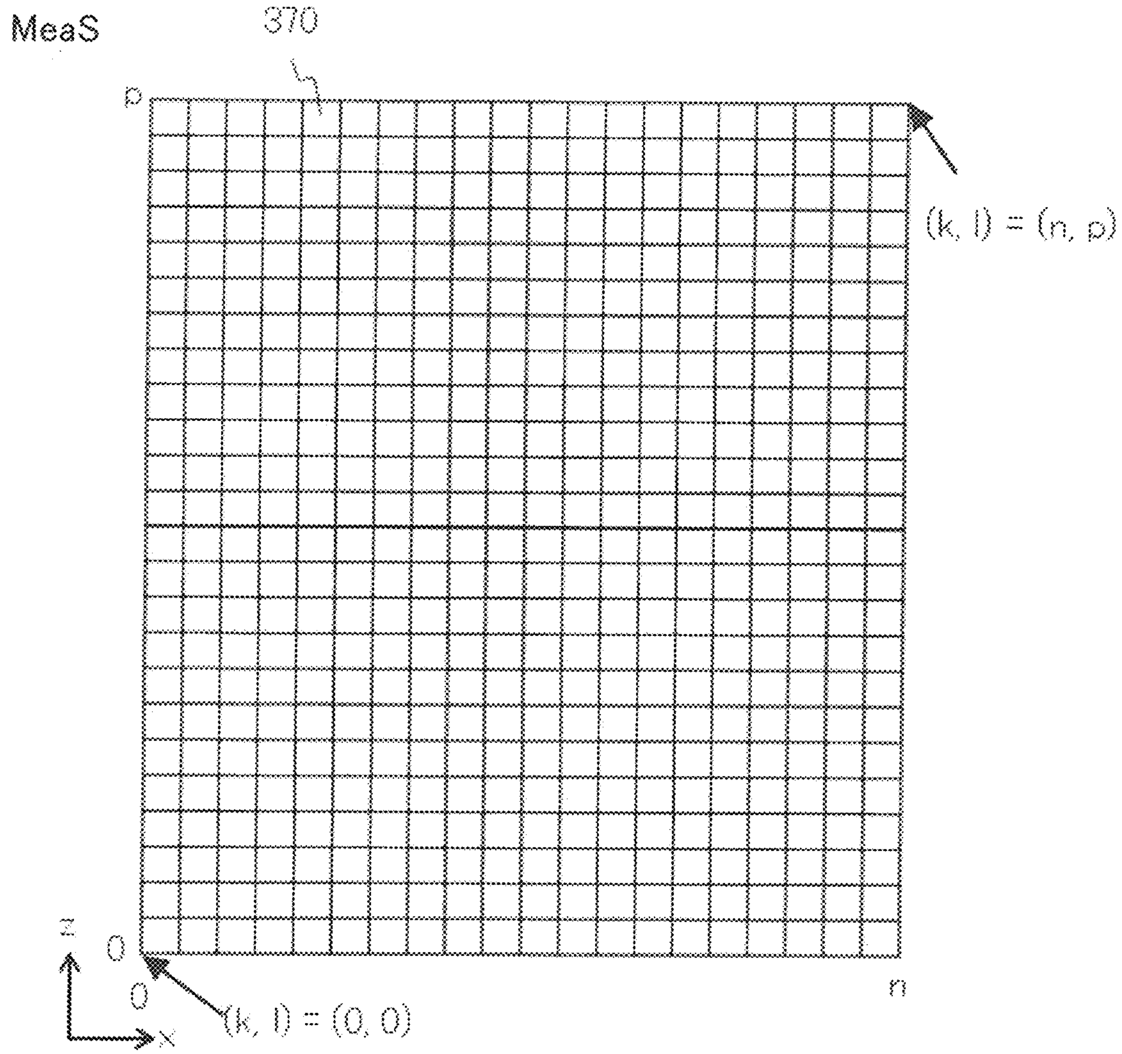
FIG. 8 shows a state in which a measurement plane of the pipe is divided into elements, according to embodiment 1.

FIG. 8 shows a state in which the measurement plane MeaS in FIG. 5 is divided into elements 370. The measurement plane MeaS is divided into n pieces in the x-axis direction and p pieces in the z-axis direction, and each point at which parallel lines dividing the plane in a grid form intersect each other, i.e., each vertex of the divided grid squares, is indicated as a position (k, l). The position (k, l) is represented by numerical values from (0, 0) to (n, p). Where the vertices of the grid squares are defined as nodes, the nodes are points located on the lines forming the elements 370. In FIG. 8, the elements 370 are shown as squares, but without limitation thereto, the elements 370 may be trapezoids, for example.

Structure analysis for the measurement plane is performed for each position of the nodes on the crack occurrence plane. For example, in a case where a crack has occurred at the node at the position (0, 0) on the crack occurrence plane, structure analysis is performed for deformations at all the nodes on the measurement plane from the position (0, 0) to the position (n, p) on the measurement plane. In the crack inspection device 100 according to embodiment 1, a strain change is used as deformation at each node on the measurement plane. Next, for example, in a case where a crack has occurred at the node at the position (0, 1) on the crack occurrence plane, structure analysis is performed for strain changes at all the nodes on the measurement plane from the position (0, 0) to the position (n, p) on the measurement plane.

In step S106 shown in FIG. 6, a crack candidate is generated at a crack occurrence location in the generated shape model M. For example, in a case where a crack has occurred at the node at the position (0, 1) on the crack occurrence plane, structure analysis is performed for displacement changes at all the nodes on the crack occurrence plane from the position (0, 0) to the position (n, m) on the crack occurrence plane. In this case, the node at the position (0, 1) corresponds to the crack and therefore is a void. Thus, a displacement change does not occur at the position (0, 1). On the other hand, since it is assumed that there are no cracks at the nodes at the positions other than (0, 1), displacement changes occur at these nodes, depending on the boundary condition.

In step S107 shown in FIG. 6, numerical analysis is performed on the generated model.

In step S108 shown in FIG. 6, the measurement plane estimated change vector V1 on the measurement plane MeaS and the state quantity deformation vector V3 representing the state quantity on the crack occurrence plane CraS are stored as learning data.

Thereafter, as shown in step S109 in FIG. 6, for the nodes present at the positions other than (0, 0) and (0, 1) on the crack occurrence plane, structure analysis is similarly performed for displacement changes at the nodes on the crack occurrence plane in accordance with the shape of the crack candidate. That is, under the assumption that the shape of the crack candidate is present on the crack occurrence plane, displacement changes at all the nodes on the crack occurrence plane are calculated. In step S110 shown in FIG. 6, the displacement changes calculated as described above are stored as learning data.

In other words, the boundary condition and the nodes on the crack occurrence plane are set in the following relationship. First, at the node on the crack occurrence plane for which a constraint condition is set, change amounts in all directions are set at zero. Thus, the node on the crack occurrence plane for which the constraint condition is set does not move. On the other hand, at nodes where no crack has occurred among nodes on the crack occurrence plane for which a load condition is set, a change amount in a certain direction is set at a value other than zero. In addition, at the node where a crack has occurred among the nodes on the crack occurrence plane for which the load condition is set, change amounts in all directions are set at zero.

Figure 9:
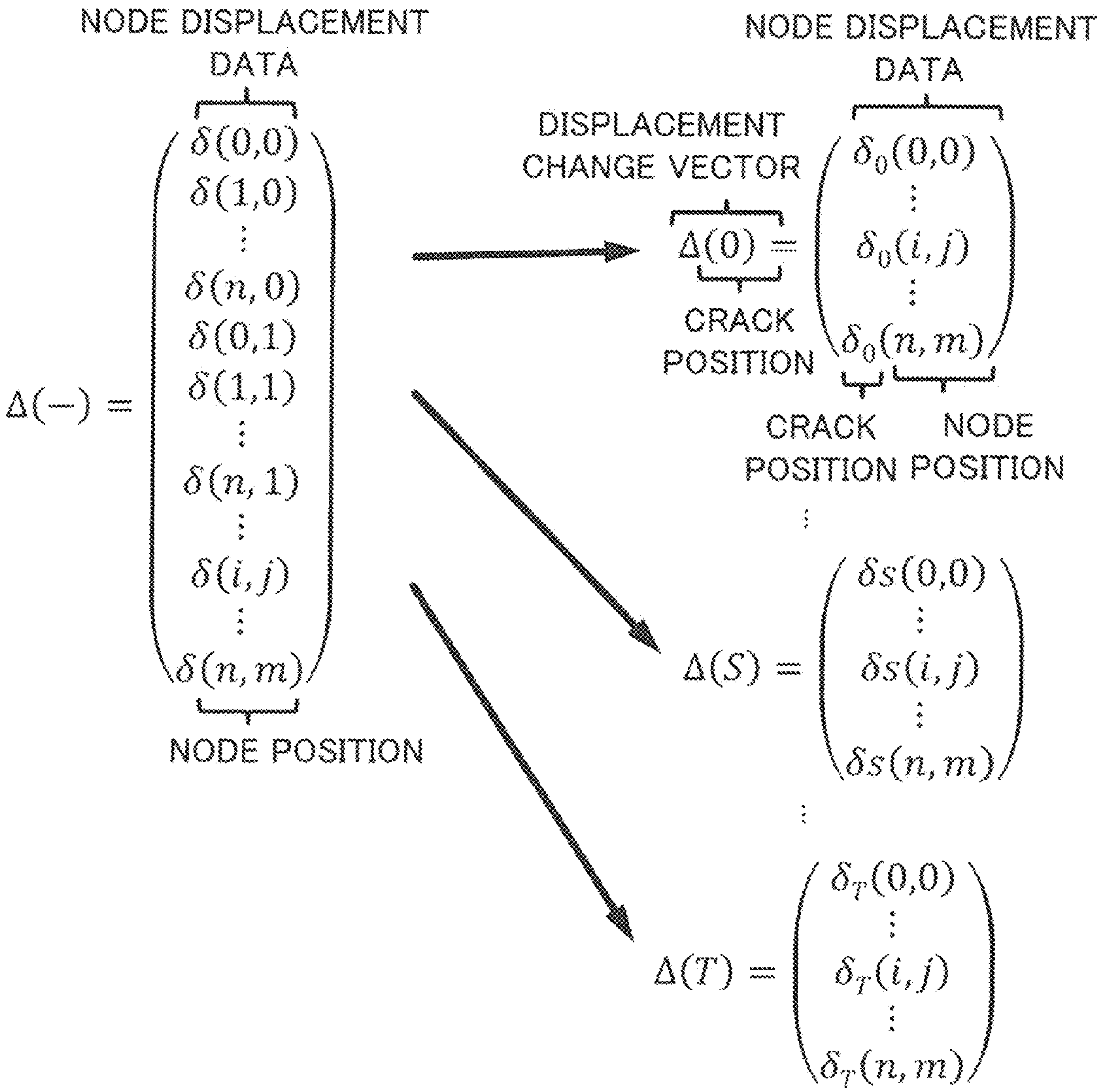
FIG. 9 shows displacement change vectors based on differences in displacement change amounts at nodes on the crack occurrence plane of the pipe, according to embodiment 1.

FIG. 9 shows displacement change vectors based on differences in displacement change amounts at nodes on the crack occurrence plane CraS as a candidate plane, for each shape of crack candidates on the crack occurrence plane CraS as the candidate plane shown in FIG. 5.

As shown in FIG. 9, displacement data at the nodes included in a column vector Δ(–) are arranged in the order determined in advance. Here, "–" denotes meaningless indefinite data. Also in the following description, "–" denotes meaningless indefinite data. In addition, δ(i, j) denotes a displacement change at the node at the position (i, j) on the crack occurrence plane CraS as a candidate plane in FIG. 7. Further, for example, δ0(i, j) is displacement data at the node at the position (i, j) in a case where a crack has occurred at the node at the first crack position in the order determined in advance for the shape of the crack candidate, and Δ(0) is a displacement change vector as the state quantity deformation vector V3 in a case where a crack has occurred at the node at the first crack position in the order determined in advance for the shape of the crack candidate at (0, 0).

The following Expression (1) represents a crack plane matrix Δcrack_diff composed of a plurality of displacement change vectors shown in FIG. 9. The displacement change vectors Δ(0) to Δ(T) shown in FIG. 9 are column vectors, and these column vectors are arranged in an order for moving a crack to be assumed at each node, thus obtaining Δcrack_diff shown in Expression (1).

[Mathematical 1]

$$\Delta_{crack\_diff} = [\,\Delta(0)\ \ldots\ \Delta(S)\ \ldots\ \Delta(T)\,] = \begin{pmatrix} \delta_0(0,0) & \ldots & \delta_S(0,0) & \ldots & \delta_T(0,0) \\ \vdots & \ddots & \vdots & \ddots & \vdots \\ \delta_0(i,j) & \ldots & \delta_S(i,j) & \ldots & \delta_T(i,j) \\ \vdots & \ddots & \vdots & \ddots & \vdots \\ \delta_0(n,m) & \ldots & \delta_S(n,m) & \ldots & \delta_T(n,m) \end{pmatrix} \quad (1)$$

In addition, the model generation unit 10 generates a strain change vector based on differences in strains at the nodes on the measurement plane in the structure analysis model.

Figure 10:
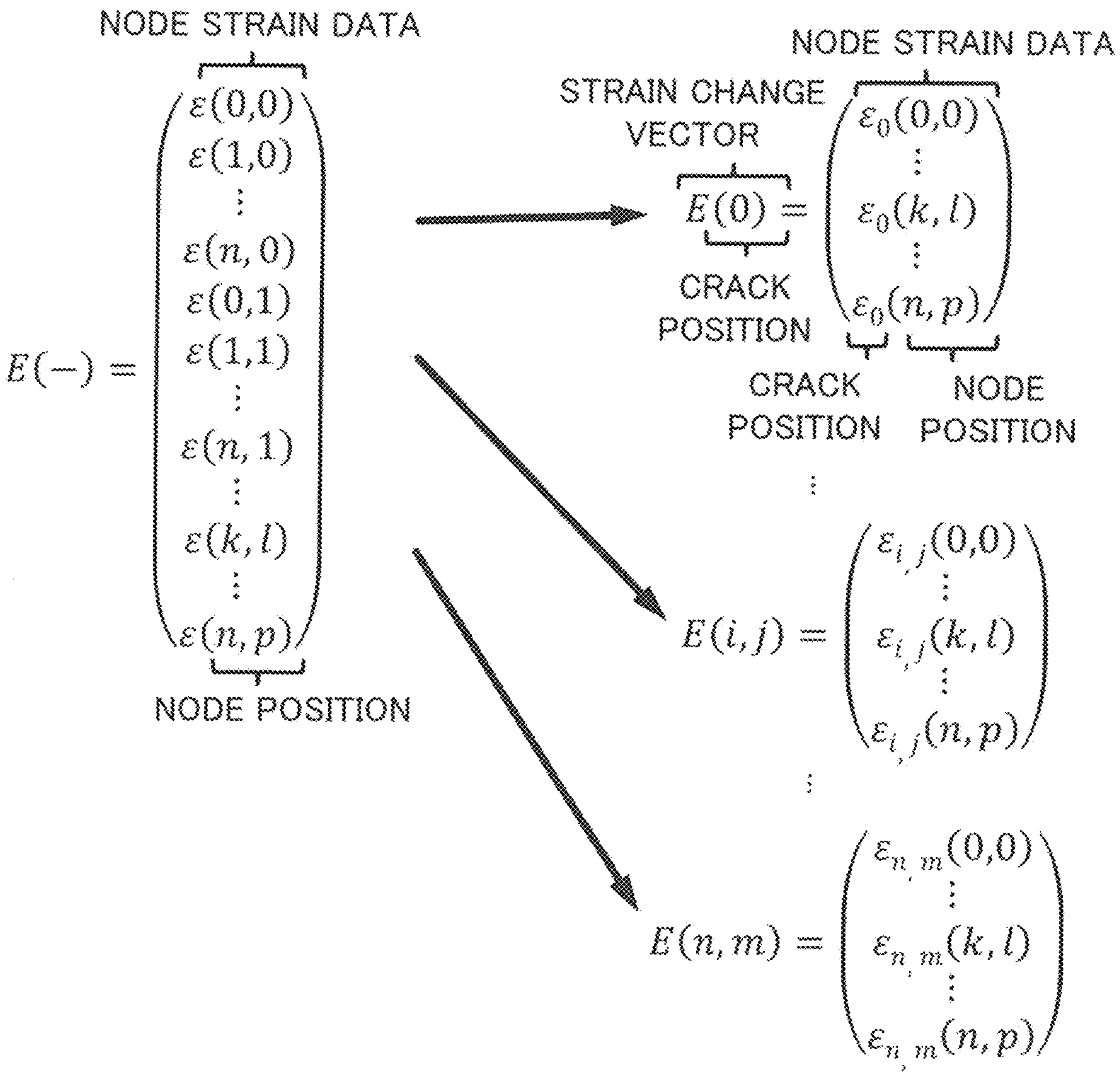
FIG. 10 shows strain change vectors based on differences in strains at nodes on the measurement plane of the pipe, according to embodiment 1.

FIG. 10 shows strain change vectors based on differences in strains at the nodes on the measurement plane MeaS shown in FIG. 8, for each shape of crack candidates on the crack occurrence plane CraS as a candidate plane shown in FIG. 5. As shown in FIG. 10, displacement data at the nodes included in a column vector E(−) are arranged in the order determined in advance.

Here, ε(k, l) is strain data at the node at the position (k, l) on the measurement plane MeaS shown in FIG. 8. Further, for example, ε0(k, l) is strain data at the node at the position (k, l) on the measurement plane MeaS in a case where a crack has occurred at the node at the first crack position in the order determined in advance for the shape of the crack candidate on the crack occurrence plane CraS as a candidate plane, and E(0) is a strain change vector as the measurement plane estimated change vector V1 in a case where a crack has occurred at the node at the first crack position in the order determined in advance for the shape of the crack candidate on the crack occurrence plane CraS as a candidate plane.

The following Expression (2) represents a measurement plane matrix Emeasure composed of a plurality of strain change vectors shown in FIG. 10. The strain change vectors E(0) to E(T) shown in FIG. 9 are column vectors, and these column vectors are arranged in an order for moving a crack to be assumed at each node, thus obtaining Emeasure shown in Expression (2).

[Mathematical 2]

$$E_{measure} = [\,E(0)\ \dots\ E(S)\ \dots\ E(T)\,] = \begin{pmatrix} \varepsilon_0(0,0) & \dots & \varepsilon_S(0,0) & \dots & \varepsilon_T(0,0) \\ \vdots & \ddots & \vdots & \ddots & \vdots \\ \varepsilon_0(i,j) & \dots & \varepsilon_S(k,l) & \dots & \varepsilon_T(k,l) \\ \vdots & \ddots & \vdots & \ddots & \vdots \\ \varepsilon_0(n,m) & \dots & \varepsilon_S(n,p) & \dots & \varepsilon_T(n,p) \end{pmatrix} \quad (2)$$

As a parameter to be stored as the learning data, a load change vector as the state quantity deformation vector V3 on the crack occurrence plane CraS as a candidate plane may be used, other than the displacement change vector as the state quantity deformation vector V3 on the crack occurrence plane CraS as a candidate plane.

Figure 11:
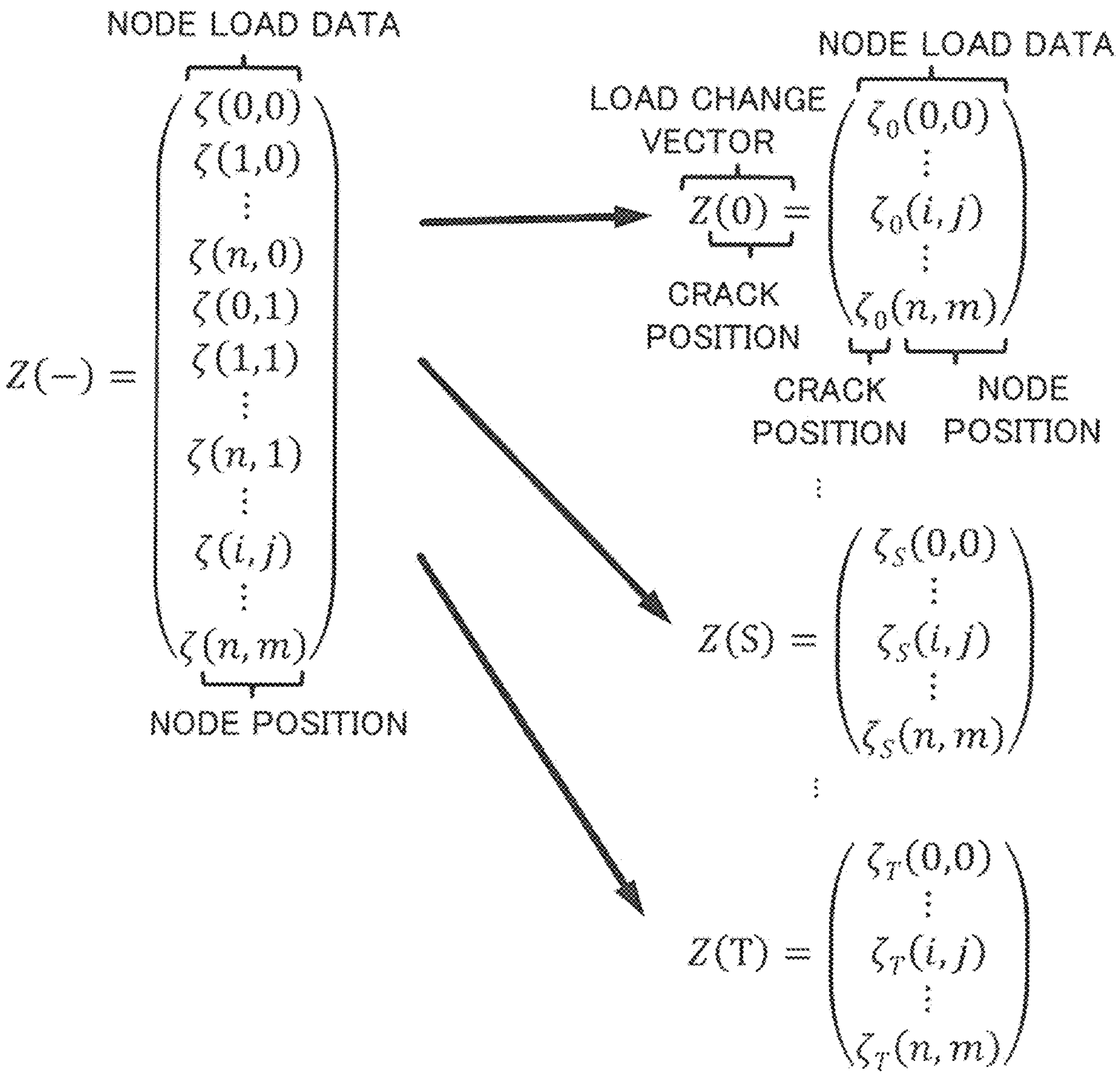
FIG. 11 shows load change vectors based on differences in load change amounts at nodes on the crack occurrence plane of the pipe, according to embodiment 1.

FIG. 11 shows load change vectors based on differences in load change amounts at nodes on the crack occurrence plane CraS as a candidate plane, for each shape of crack candidates on the crack occurrence plane CraS as a candidate plane shown in FIG. 5.

As shown in FIG. 11, displacement data at the nodes included in a column vector Z(−) are arranged in the order determined in advance. Further, for example, ζ0(i, j) is load data at the node at the position (i, j) in a case where a crack has occurred at the node at the first crack position in the order determined in advance for the shape of the crack candidate on the crack occurrence plane CraS as a candidate plane, and Z(0) is a load change vector in a case where a crack has occurred at the first crack position node in the order determined in advance for the shape of the crack candidate on the crack occurrence plane CraS as a candidate plane. Specifically, a force at the node at a position where there is a crack becomes zero, and a force at the node at a position where there is no crack becomes a value other than zero.

As a parameter to be stored as the learning data, a displacement change vector or an angle change vector on the measurement plane MeaS may be used, other than the strain change vector based on differences in strains at nodes on the measurement plane MeaS. A case of using a displacement change as deformation at a node on the measurement plane will be described. In a case of using a displacement change as deformation at a node on the measurement plane, the model generation unit 10 generates displacement change vectors based on differences in displacements at nodes on the measurement plane in the structure analysis model.

Figure 12:
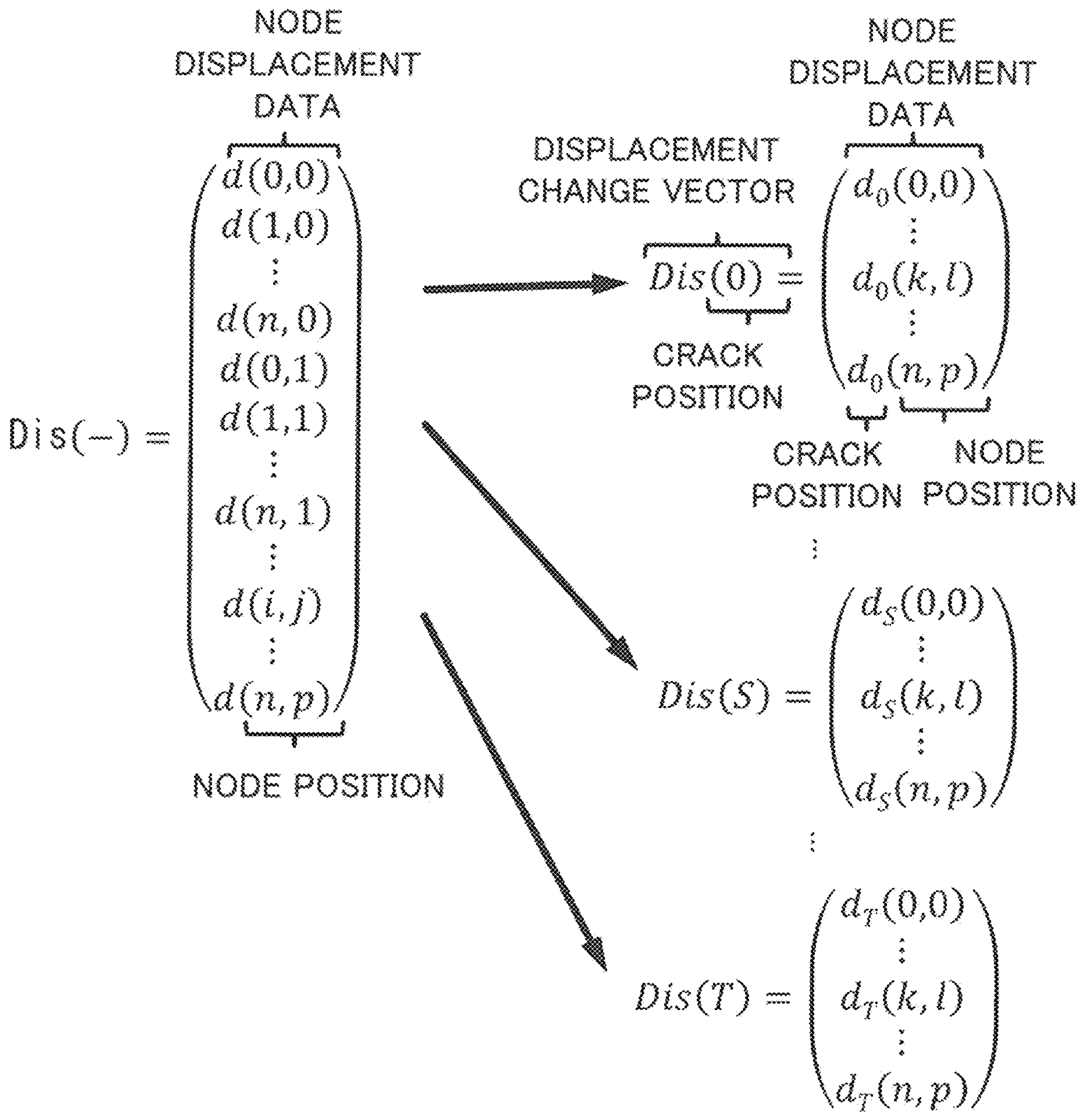
FIG. 12 shows displacement change vectors representing displacement change amounts at nodes on the measurement plane of the pipe, according to embodiment 1.

FIG. 12 shows displacement change vectors, as the measurement plane estimated change vector V1, representing displacement change amounts at nodes on the measurement plane MeaS shown in FIG. 5, for each shape of crack candidates on the crack occurrence plane CraS as the candidate plane shown in FIG. 5.

As shown in FIG. 12, displacement data at the nodes included in a column vector Dis(−) are arranged in the order determined in advance. Here, d(k, l) is a displacement change at the node at the position (k, l) on the measurement plane MeaS. Further, for example, d0(k, l) is displacement data at the node at the position (k, l) on the measurement plane MeaS in a case where a crack has occurred at the node at the first crack position in the order determined in advance for the shape of the crack candidate on the crack occurrence plane CraS as a candidate plane, and Dis(0) is a displacement change vector in a case where a crack has occurred at the node at the first crack position in the order determined in advance for the shape of the crack candidate on the crack occurrence plane CraS as a candidate plane.

The following Expression (3) represents a measurement plane matrix Dismeasure composed of a plurality of displacement change vectors shown in FIG. 12. In a case of using a displacement change as deformation at a node on the measurement plane, Dismeasure is used as a measurement plane matrix. The displacement change vectors Dis(0) to Dis(T) shown in FIG. 12 are column vectors, and these column vectors are arranged in an order for moving a crack to be assumed at each node, thus obtaining Dismeasure shown in Expression (3)

[Mathematical 3]

$$Dis_{measure} = [\,Dis(0)\ \dots\ Dis(S)\ \dots\ Dis(T)\,] = \begin{pmatrix} d_0(0,0) & \dots & d_S(0,0) & \dots & d_T(0,0) \\ \vdots & \ddots & \vdots & \ddots & \vdots \\ d_0(k,l) & \dots & d_S(k,l) & \dots & d_T(k,l) \\ \vdots & \ddots & \vdots & \ddots & \vdots \\ d_0(n,p) & \dots & d_S(n,p) & \dots & d_T(n,p) \end{pmatrix} \quad (3)$$

Next, a case of using an angle change as deformation at a node on the measurement plane will be described.

In a case of using an angle change as deformation at a node on the measurement plane, the model generation unit 10 generates angle change vectors based on differences in angles at nodes on the measurement plane in the structure analysis model.

Figure 13:
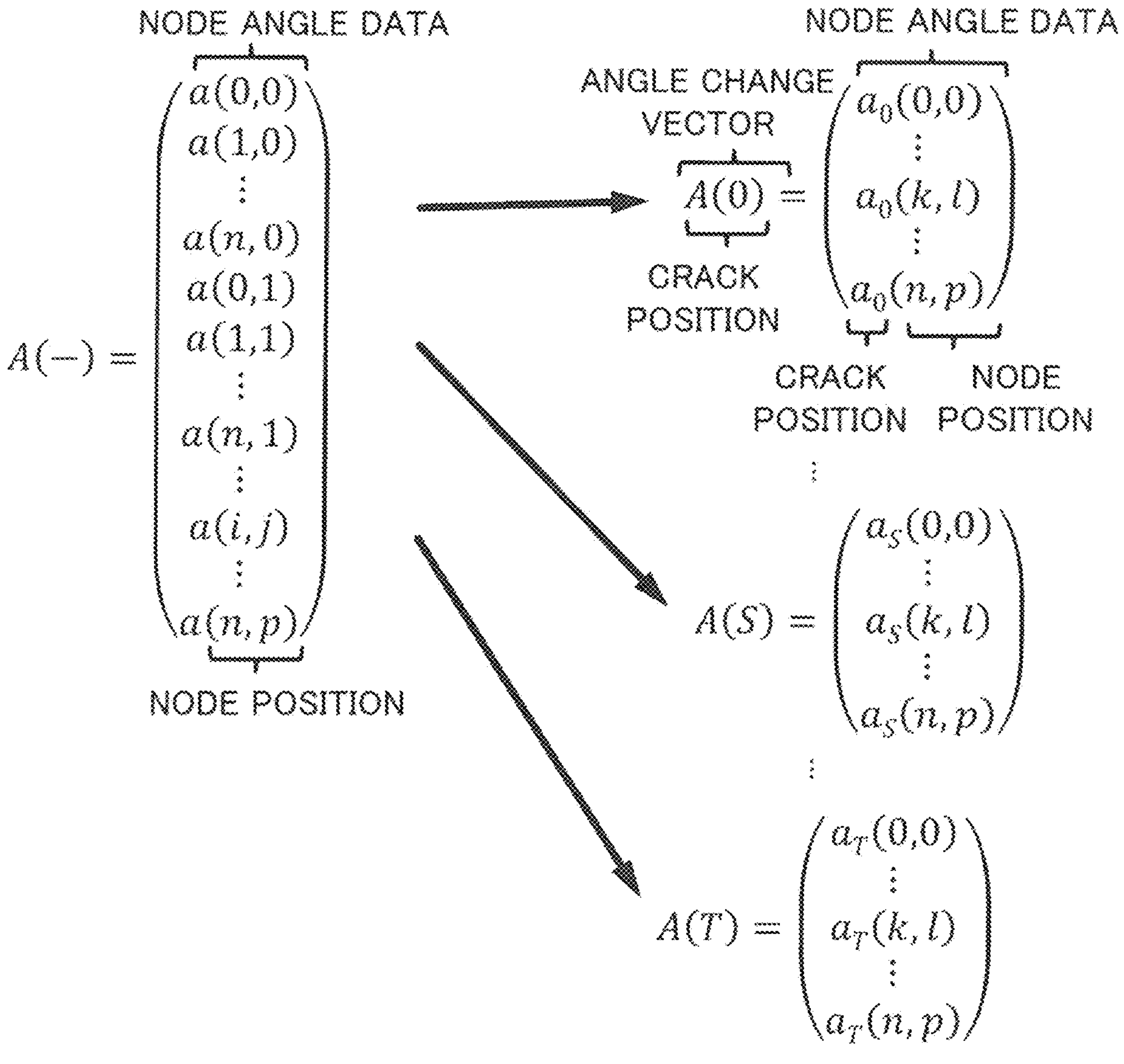
FIG. 13 shows angle change vectors representing angle change amounts at nodes on the measurement plane of the pipe, according to embodiment 1.

FIG. 13 shows angle change vectors, as the measurement plane estimated change vector V1, representing angle change amounts at the nodes on the measurement plane MeaS shown in FIG. 5, for each shape of crack candidates on the crack occurrence plane CraS as a candidate plane shown in FIG. 5.

As shown in FIG. 13, displacement data at the nodes included in a column vector A(−) are arranged in the order determined in advance. Here, a(k, l) is an angle change at the node at the position (k, l) on the measurement plane MeaS. Further, for example, a0(k, l) is angle data at the node at the position (k, l) on the measurement plane MeaS in a case where a crack has occurred at the node at the first crack position in the order determined in advance for the shape of the crack candidate on the crack occurrence plane CraS as a candidate plane, and A(0, 0) is an angle change vector in a case where a crack has occurred at the node at the first crack position in the order determined in advance for the shape of the crack candidate on the crack occurrence plane CraS as a candidate plane.

Figure 23:
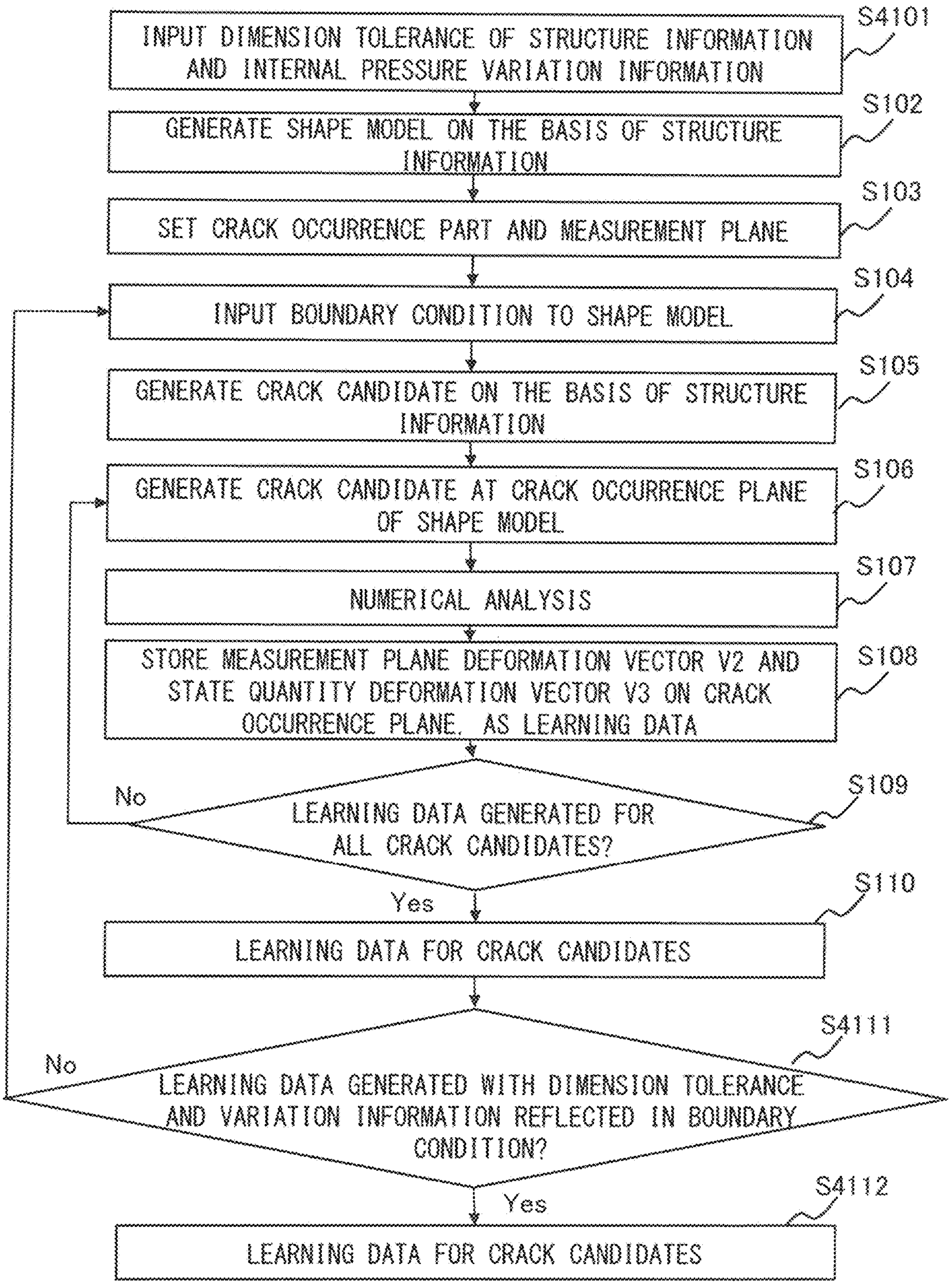
FIG. 23 is a flowchart showing the detailed process in a model generation unit of a crack inspection device for inspecting a crack of a pipe in embodiment 4.

The following Expression (4) represents a measurement plane matrix Ameasure composed of a plurality of angle change vectors shown in FIG. 13. In a case of using an angle change as deformation at a node on the measurement plane, Ameasure is used as a measurement plane matrix. The angle change vectors A(0) to A(T) shown in FIG. 23 are column vectors and these column vectors are arranged in an order for moving a crack to be assumed at each node, thus obtaining Ameasure shown in Expression (4).

[Mathematical 4]

$$A_{measure} = [\,A(0)\ \ldots\ A(S)\ \ldots\ A(T)\,] = \begin{pmatrix} a_0(0,0) & \ldots & a_S(0,0) & \ldots & a_T(0,0) \\ \vdots & \ddots & \vdots & \ddots & \vdots \\ a_0(k,l) & \ldots & a_S(k,l) & \ldots & a_T(k,l) \\ \vdots & \ddots & \vdots & \ddots & \vdots \\ a_0(n,p) & \ldots & a_S(n,p) & \ldots & a_T(n,p) \end{pmatrix} \quad (4)$$

In step S109 in FIG. 6, whether or not learning data have been generated for all the crack candidates is determined, and if learning data have not been generated for all the crack candidates, the process returns to step S106, to change the shape of the crack.

If learning data have been generated for all the crack candidates, the learning data for the crack candidates are outputted in step S110.

Next, the details of measurement by the measurement unit 20 of the crack inspection device 100 will be described.

Figure 14:
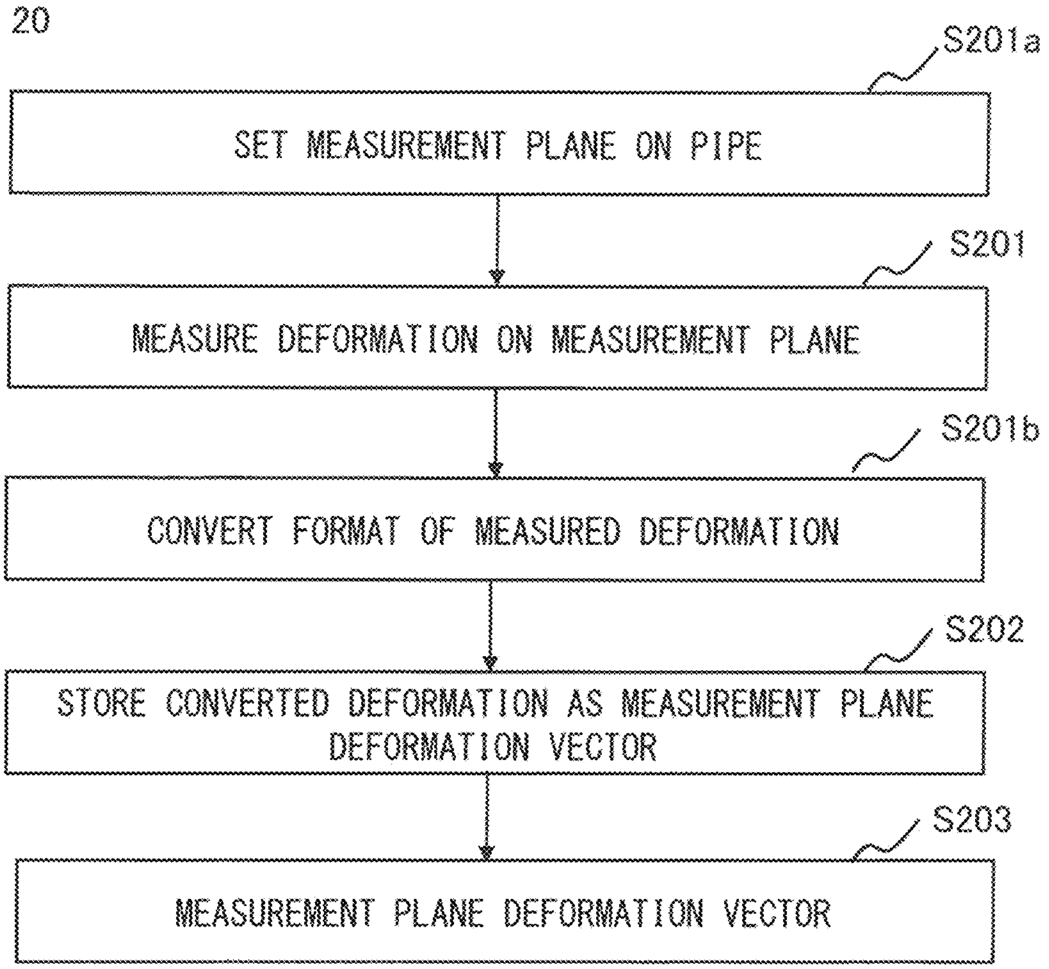
FIG. 14 is a flowchart showing the detailed process in a measurement unit of the crack inspection device according to embodiment 1.

FIG. 14 is a flowchart showing the detailed process in the measurement unit 20 of the crack inspection device 100 according to the present embodiment 1.

In FIG. 14, steps corresponding to those shown in FIG. 2 are denoted by the same reference characters.

In step S201*a*, the measurement plane MeaS is set at the outer surface of the pipe 40, on the basis of the shape model M generated by the model generation unit 10.

In step S201, deformation on the measurement plane MeaS at the outer surface of the pipe 40 is measured.

In step S201*b*, the measured deformation of the outer surface of the pipe 40 is converted into the same format as the measurement plane estimated change vector V1 of the learning data. The format is, for example, the format shown in FIG. 10.

In step S202, the converted deformation on the measurement plane is stored as a deformation vector.

In step S203, the stored deformation vector is outputted as the measurement plane deformation vector V2.

An actual measurement method in the measurement unit 20 performed through steps S201*a* to S203 in FIG. 14 will be described in detail.

With at least a partial area of the outer surface of the pipe 40 set as the measurement plane MeaS, the measurement unit 20 measures deformation of the outer surface on the measurement plane MeaS.

The measurement unit 20 is, for example, a strain gauge attached to the measurement plane MeaS. The strain gauge is formed of a base material and a resistance material. The base material is made from an electric insulating material. The resistance material is attached to the base material and a part protruding from the base material is provided with a lead wire. The base material is attached to an outer surface of a structural body via an adhesive, and when the base material extends or contracts, the resistance material also extends or contracts, so that the electric resistance of the resistance material changes. The lead wire of the resistance material is connected to the measurement unit 20.

For example, when strain has occurred on the outer surface of the pipe 40, the resistance material extends or contracts, so that the electric resistance of the resistance material changes. In step S201 shown in FIG. 14, the change the electric resistance of the resistance material measured as described above is transmitted to the control unit (not shown) of the measurement unit 20 via the lead wire.

As described above, in step S201, a strain change on the outer surface of the pipe 40 is measured by the strain gauge. With this configuration, the measurement unit 20 can measure a strain change on the measurement plane MeaS present at the outer surface of the pipe 40 in a state in which a pressure is applied. With the measurement plane MeaS set as a measurement plane, the measurement unit 20 outputs the measured deformation on the measurement plane as the measurement plane deformation vector V2.

In a case of using a displacement change as deformation at a node on the measurement plane, the measurement unit 20 has a displacement sensor for measuring a displacement at each node on the measurement plane MeaS. As the displacement, sensor, for example, a laser displacement sensor, an eddy-current-loss-type displacement sensor, a capacitive displacement sensor, a contact-type displacement sensor, a wire-type displacement sensor, a laser micrometer, or the like, is used. The measurement unit 20 measures a displacement change of the outer surface on the measurement plane MeaS and outputs the measured displacement change as the measurement plane deformation vector V2.

In a case of using an angle change as deformation at a node on the measurement plane, the measurement unit 20 has a slope sensor for measuring an angle at each node on the measurement plane MeaS.

The measurement unit 20 may measure deformation on the measurement plane MeaS of the pipe 40 through digital image correlation. In this case, at a stage when there is no crack Cra in the pipe 40 or a stage when the shape of the crack Cra in the pipe 40 is grasped by a different inspection method, a photograph of the measurement plane MeaS is captured. In an inspection later, a photograph of the same part is captured and is subjected to image analysis based on digital image correlation for comparison, thus obtaining a deformation amount.

Next, operation of the measurement unit 20 will be described. The measurement unit 20 measures strain changes of the outer surface on the measurement plane MeaS of the pipe 40, under each of a condition that there is no crack Cra inside the pipe 40 and a condition that the crack Cra has occurred inside the pipe 40. The measured strain changes are arranged as a column vector in the same order as in the learning data, and the column vector is represented by Expression (5).

[Mathematical 5]

$$\tilde{\varepsilon} = \begin{bmatrix} d\tilde{\varepsilon}_{0*0} \\ \vdots \\ d\tilde{\varepsilon}_{n*p} \end{bmatrix} \tag{5}$$

The measurement unit 20 obtains the column vector shown in Expression (5), as the measurement plane deformation vector V2. In the measurement plane deformation vector V2, a suffix "0*0" indicates that the data is for the node (0, 0) on the measurement plane MeaS in the FIG. 8. The measurement plane deformation vector measured as described above is outputted to the analysis unit 150 for analyzing the crack state in the crack inspection device 100.

In a case of selectively using any of a strain change, a displacement change, and an angle change as deformation at a node on the measurement plane, strain change vectors, displacement change vectors representing displacement change amounts at nodes on the measurement plane, and angle change vectors representing angle change amounts at nodes on the measurement plane, are all stored as learning data, and the measurement unit 20 measures at least one of a strain, a displacement, and an angle at each node on the measurement plane MeaS.

Control in the crack state analysis unit 30 of the crack inspection device 100 will be described.

Figure 15:
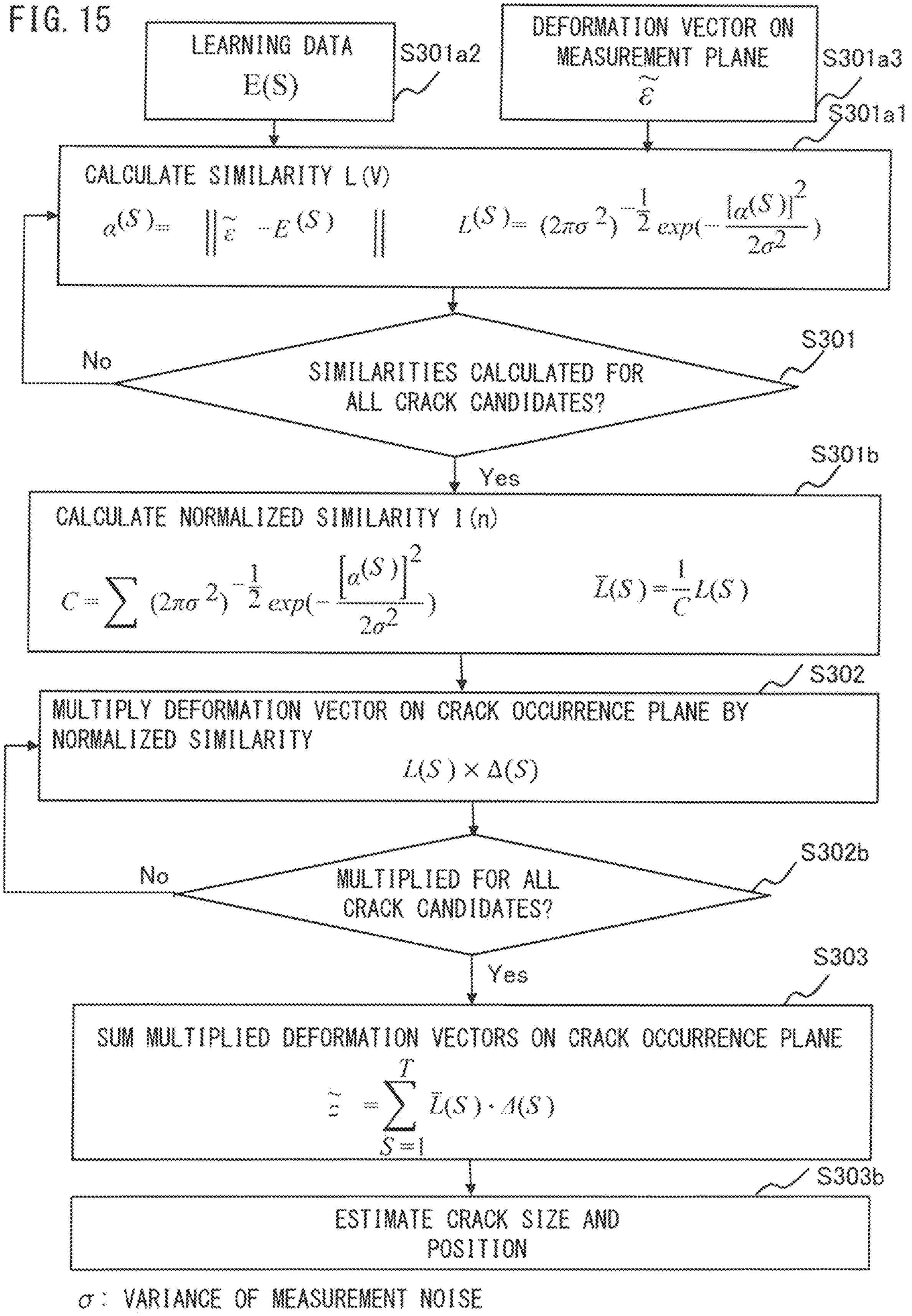
FIG. 15 is a flowchart showing the detailed process in a crack state analysis unit of the crack inspection device according to embodiment 1.

FIG. 15 is a flowchart showing the details of an analysis process in the crack state analysis unit 30. In FIG. 15, steps corresponding to those already shown in FIG. 2 are denoted by the same reference characters.

In step S301*a*2, the measurement plane estimated change vectors V1 which are learning data outputted from the model generation unit 10 are acquired.

In step S301*a*3, the measurement plane deformation vector V2 outputted from the measurement unit 20 is acquired.

In step S301*a*1, in order to calculate a similarity between vectors, a strain change matrix E(s) composed of the measurement plane estimated change vectors V1 of differences in strains at the nodes on the measurement plane, included in the learning data acquired in step S301*a*2, is received.

In order to calculate a similarity between the measurement plane deformation vector V2 shown by Expression (5) and each measurement plane estimated change vector V1, a Euclidean distance which is an L2 norm is calculated as shown by Expression (6). By using a Euclidean distance as a similarity, it is possible to calculate a high-accuracy similarity with a limited processing amount.

[Mathematical 6]

$$\alpha^{(S)} = \left\| \tilde{\varepsilon} - E^{(S)} \right\| \tag{6}$$

Here, it is assumed that a variance of the Euclidean distance α(s) calculated by Expression (6) is the same as a variance σ2 of the measurement plane deformation vector shown by Expression (5), and from the Euclidean distance α(s) calculated by Expression (6) and the variance σ2 of the measurement plane deformation vector, a normal distribution is assumed and a likelihood function shown by Expression (7) is calculated.

[Mathematical 7]

$$L^{(S)} = (2\pi\sigma^2)^{-\frac{1}{2}} \exp\left( -\frac{[\alpha^{(S)}]^2}{2\sigma^2} \right) \tag{7}$$

Here, S takes a value from 1 to T and denotes each case of learning data.

In step S301, similarities are calculated and determined for all the crack candidates in the learning data. Then, the process proceeds to step S301*b*.

In step S301*b*, in order to normalize the likelihood function shown by Expression (7), a value C obtained by summing likelihood functions is calculated as shown by Expression (8).

[Mathematical 8]

$$C = \sum_{S=1}^{T} (2\pi\sigma^2)^{-\frac{1}{2}} \exp\left( -\frac{[\alpha^{(S)}]^2}{2\sigma^2} \right) \tag{8}$$

The likelihood function calculated by Expression (7) is normalized by C shown by Expression (8), thus obtaining Expression (9).

[Mathematical 9]

$$\overline{L}(S) = \frac{1}{C} L(S) \tag{9}$$

The normalized likelihood function shown by Expression (8) is equal to a likelihood function of a distribution of displacement changes on the crack occurrence plane CraS as a candidate plane for a crack.

In step S302, the crack plane matrix Δcrack_diff(S) shown in FIG. 8, included in the learning data, is received, and the likelihood function shown by Expression (9) and the corresponding displacement change vector Δ(S) are multiplied for all learning data. In step 157, whether or not the multiplication has been performed for all the learning data is determined. In step S303, the multiplication results are summed for all the crack candidates as shown by Expression (10), thus obtaining an expected value of a displacement change in the likelihood function.

In step S303*b*, the value shown by Expression (10) is outputted as an estimated crack Cra. Regarding the estimated crack Cra, the expected value of the displacement change obtained by Expression (10) is subjected to threshold processing using a predetermined threshold, thereby obtaining the position and the size of the crack estimated on the crack occurrence plane.

[Mathematical 10]

$$\bar{z} = \sum_{S=1}^{T} \overline{L}(S) \cdot \Delta(S) \tag{10}$$

As with the displacement change vector Δ(S), an expected value may be calculated using a load change vector Z(S) which is a vector composed of state quantities indicating the states at the nodes on the crack occurrence plane. The normalized likelihood function shown by Expression (9) becomes equal to a likelihood function of a load change at each node on the crack occurrence plane CraS as a candidate plane. The likelihood function shown by Expression (9) and the corresponding load change vector Z(s) may be multiplied and then summed for all the crack candidates, to obtain an expected value of a load change in the likelihood function, and the obtained expected value may be subjected to threshold processing using a predetermined threshold, thereby obtaining the position and the size of the crack estimated on the crack occurrence plane. The vector quantities used for estimation thus far may be treated as a two-dimensional array or image data, and even in this case, the crack estimation device according to the present disclosure can be implemented.

Using the measurement plane matrix Dismeasure instead of the measurement plane matrix Emeasure, the crack state analysis unit 30 calculates a Euclidean distance as a similarity between the measurement plane deformation vector of displacement changes acquired from the measurement unit 20 and the measurement plane matrix Dismeasure, and estimates the position and the size of the crack on the crack occurrence plane CraS as a candidate plane.

Using the measurement plane matrix Ameasure instead of the measurement plane matrix Emeasure, the crack state analysis unit 30 calculates a Euclidean distance as a similarity between the measurement plane deformation vector of angle changes acquired from the measurement unit 20 and the measurement plane matrix Ameasure, and estimates the position and the size of the crack on the crack occurrence plane CraS as a candidate plane.

The crack inspection device of the present embodiment configured as described above includes: a measurement unit which measures deformation on an outer surface of a pipe for sending a fluid; and a control unit which estimates a crack in an inner surface of the pipe on the basis of a measurement value from the measurement unit. The control unit generates a shape model that models a shape of the pipe, on the basis of structure information indicating a structure of the pipe. On the basis of the shape model, the control unit performs first setting control in which a part where a crack occurs in the inner surface of the pipe is specified and an area including the part is set as a crack occurrence plane, and performs second setting control in which an area on the outer surface of the pipe where deformation will occur when a crack has occurred at the crack occurrence plane is specified and the area is set as a measurement plane. On the basis of the shape model imparted with a boundary condition including first pressure information about a pressure applied to the inner surface of the pipe by the fluid, the control unit performs third setting control in which a change on the measurement plane when a crack has occurred at the crack occurrence plane is set as a measurement plane estimated change vector, for each of a plurality of kinds of crack candidates. The control unit derives deformation on the measurement plane as a measurement plane deformation vector on the basis of the measurement value from the measurement unit, calculates a similarity between the derived measurement plane deformation vector and the measurement plane estimated change vector for each crack candidate, and normalizes the similarity. The control unit performs first estimation control in which a crack occurring at the crack occurrence plane is estimated from the normalized similarity and a state quantity deformation vector indicating a deformation state on the crack occurrence plane for each crack candidate.

As described above, the control unit of the crack inspection device of the present embodiment generates the shape model that models the shape of the pipe on the basis of structure information indicating the structure of the pipe. Then, on the basis of the shape model, the control unit performs the first setting control in which a part where a crack occurs in the inner surface of the pipe is specified and an area including the part is set as the crack occurrence plane.

As described above, for the shape model generated in the present embodiment, complicated pipe structure information including a branch path, a welding portion, and the like, associated with occurrence of a crack, is used, and therefore the part where a crack occurs in the inner surface of the pipe can be accurately specified as a crack occurrence plane. At the same time, it becomes possible to set such a measurement plane that enables accurate measurement for deformation on the outer surface of the pipe that occurs when a crack occurs on the crack occurrence plane.

Further, on the basis of the shape model imparted with the boundary condition including the first pressure information about a pressure applied to the inner surface of the pipe by the fluid, the control unit performs the third setting control in which a change on the measurement plane when a crack has occurred at the crack occurrence plane is set as the measurement plane estimated change vector, for each of the plurality of kinds of crack candidates.

Thus, even in a case where the state of wear or friction on the inner surface of the pipe has changed due to a fluid in which pressure change, flow rate change, or the like occurs, since the measurement plane estimated change vector which is learning data is set using the shape model including the first pressure information about a pressure applied to the inner surface of the pipe, it is possible to derive accurate learning data.

Further, the control unit derives deformation on the measurement plane as the measurement plane deformation vector, calculates the similarity between the derived measurement plane deformation vector and the measurement plane estimated change vector for each crack candidate, and normalizes the similarity. Then, the control unit performs the first estimation control in which a crack occurring at the crack occurrence plane is estimated from the normalized similarity and the state quantity deformation vector indicating a deformation state on the crack occurrence plane for each crack candidate.

Thus, since estimation is performed while data having high similarities are weighted, it is possible to limit measurement plane deformation vectors and measurement plane estimated change vectors so as to target only cracks that are likely to occur in the pipe, whereby labor for learning data generation and measurement can be reduced and the inspection period can be shortened, and also, estimation accuracy is improved.

Further, since estimation is performed with a normalized similarity between the measurement plane estimated change vector and the measurement plane deformation vector, even in a case of a crack shape not included in the learning data generated by the model generation unit, it is possible to estimate the crack shape using the normalized similarity, whereby estimation accuracy is improved.

Further, since the learning data is generated through numerical analysis, it becomes unnecessary to create a test piece of the pipe and thus inspection preparation can be simplified. In addition, since models can be prepared for a large number of crack candidates, estimation accuracy is improved.

Here, in a case of adopting a configuration in which, instead of a strain change, a displacement change or an angle change is used for the measurement plane deformation vector, changes on the measurement plane in the pipe can be measured in a shorter period and with higher accuracy than in a case of strain measurement. In addition, in a case of selectively using a strain change, a displacement change, and an angle change as deformation at a node on the measurement plane, it is possible to adapt to various shapes of pipes.

In the crack inspection device of the present embodiment configured as described above, in the third setting control, the control unit calculates a displacement in the pipe on the basis of the first pressure information about the pressure applied to the inner surface of the pipe by the fluid, and sets the measurement plane estimated change vector for each of the plurality of kinds of crack candidates, on the basis of the shape model imparted with the displacement as the boundary condition.

As described above, in the shape model used in setting of the learning data in which the measurement plane estimated change vector is set for each of a plurality of crack candidates, displacement of the pipe due to the first pressure information such as change in a pressure applied to the inner surface of the pipe by the fluid is reflected.

Thus, even in a case where displacement of the pipe occurs due to the fluid in which pressure change, flow rate change, or the like occurs, it is possible to derive accurate learning data.

In the crack inspection device of the present embodiment configured as described above, in the first estimation control, the control unit multiplies the state quantity deformation vector on the crack occurrence plane and the normalized similarity for each of the crack candidates and sums resultant values for all the crack candidates, and then estimates a crack occurring at the crack occurrence plane from a result of the summing.

As described above, the state quantity deformation vector on the crack occurrence plane and the normalized similarity are multiplied for each crack candidate and then are summed for all crack candidates, and from a result thereof, a crack that has occurred on the crack occurrence plane is estimated. Thus, uniqueness of a solution, presence of a solution, and premise of a solution are satisfied, so that accurate crack estimation can be performed.

In the crack inspection device of the present embodiment configured as described above, the measurement unit measures deformation on the outer surface of the pipe through digital image correlation, and the control unit performs image analysis based on digital image correlation, for the measurement value from the measurement unit, to derive the measurement plane deformation vector.

As described above, deformation on the measurement plane is measured in a contactless manner on the basis of an image. Thus, it is possible to avoid increase in an inspection period and inspection labor that would be caused in a case where there are many inspection points as in a contact-type method such as state monitoring by a pasted strain gauge or ultrasonic flaw detection, for example.

In the crack inspection device of the present embodiment configured as described above, in the first setting control, the control unit specifies a part where a crack occurs in the inner surface of the pipe, using the first pressure information about the pressure applied to the inner surface of the pipe by the fluid.

As described above, in specifying the crack occurrence plane in the pipe, the control unit may use the first pressure information about the pressure applied to the inner surface of the pipe as well as the structure information about the pipe. Thus, an area where crack occurs in the pipe can be more accurately specified.

Embodiment 2

Hereinafter, embodiment 2 of the present disclosure will be described focusing on difference from the above embodiment 1, with reference to the drawings. The same parts as those in the above embodiment 1 are denoted by the same reference characters and the description thereof is omitted.

Figure 16:
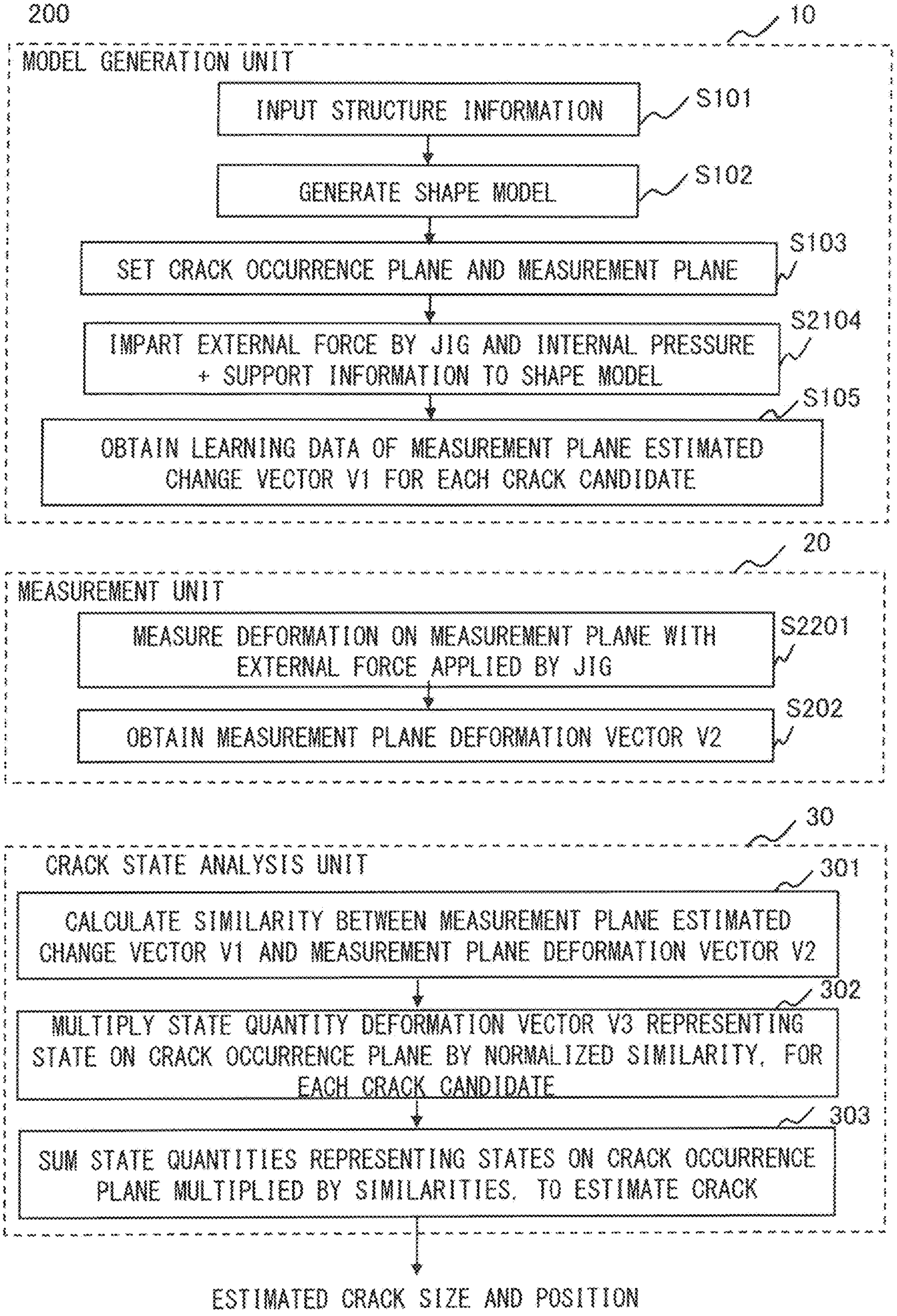
FIG. 16 is a flowchart schematically showing a crack inspection method in a crack inspection device according to embodiment 2.

FIG. 16 is a flowchart schematically showing a crack inspection method in a crack inspection device 200 according to embodiment 2.

Figure 17:
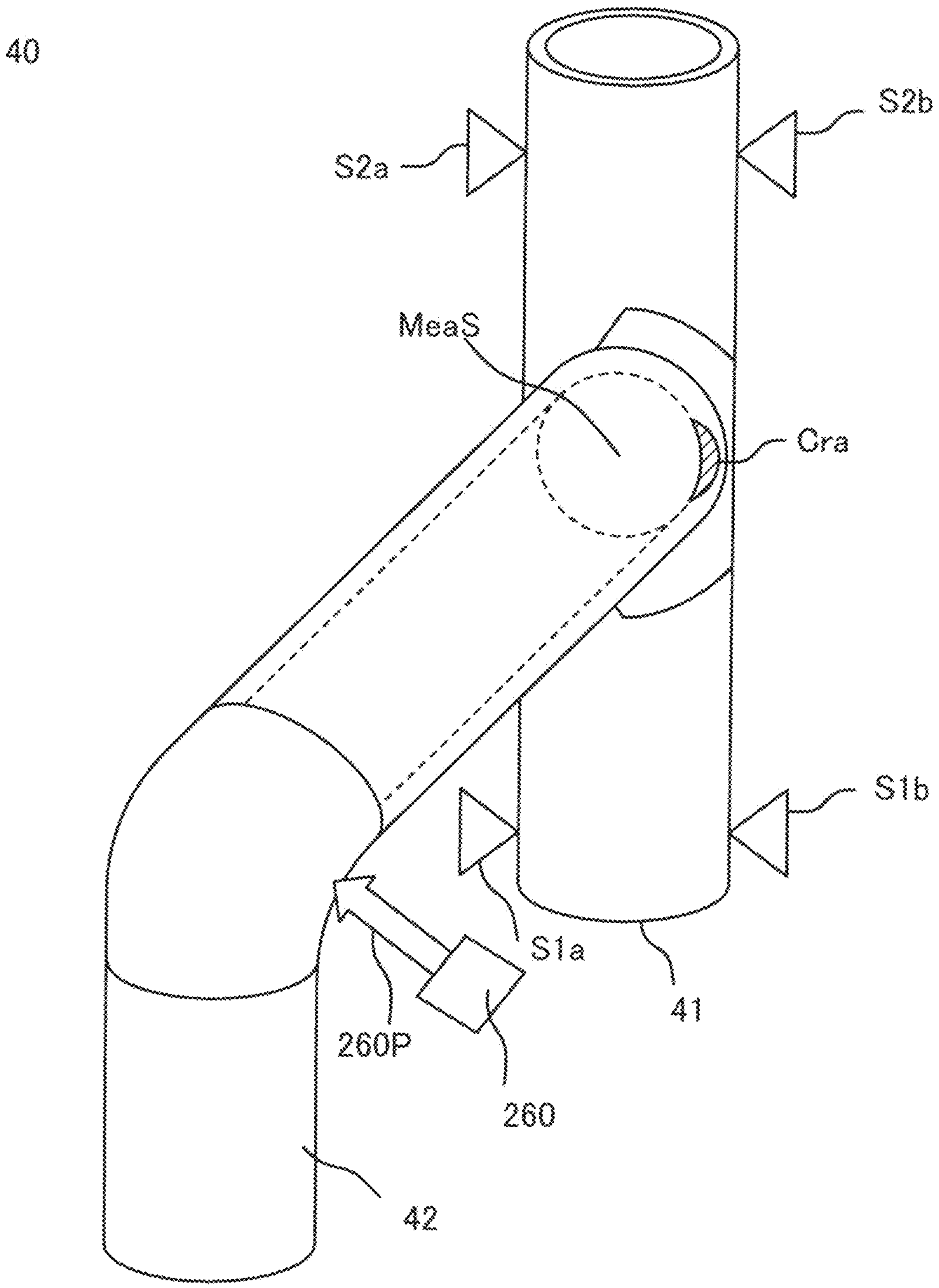
FIG. 17 shows an example of a structure of a pipe that is an inspection target of a crack inspection device according to embodiment 2.

FIG. 17 shows an example of the structure of the pipe 40 that is an inspection target of the crack inspection device 200 according to embodiment 2.

Figure 18:
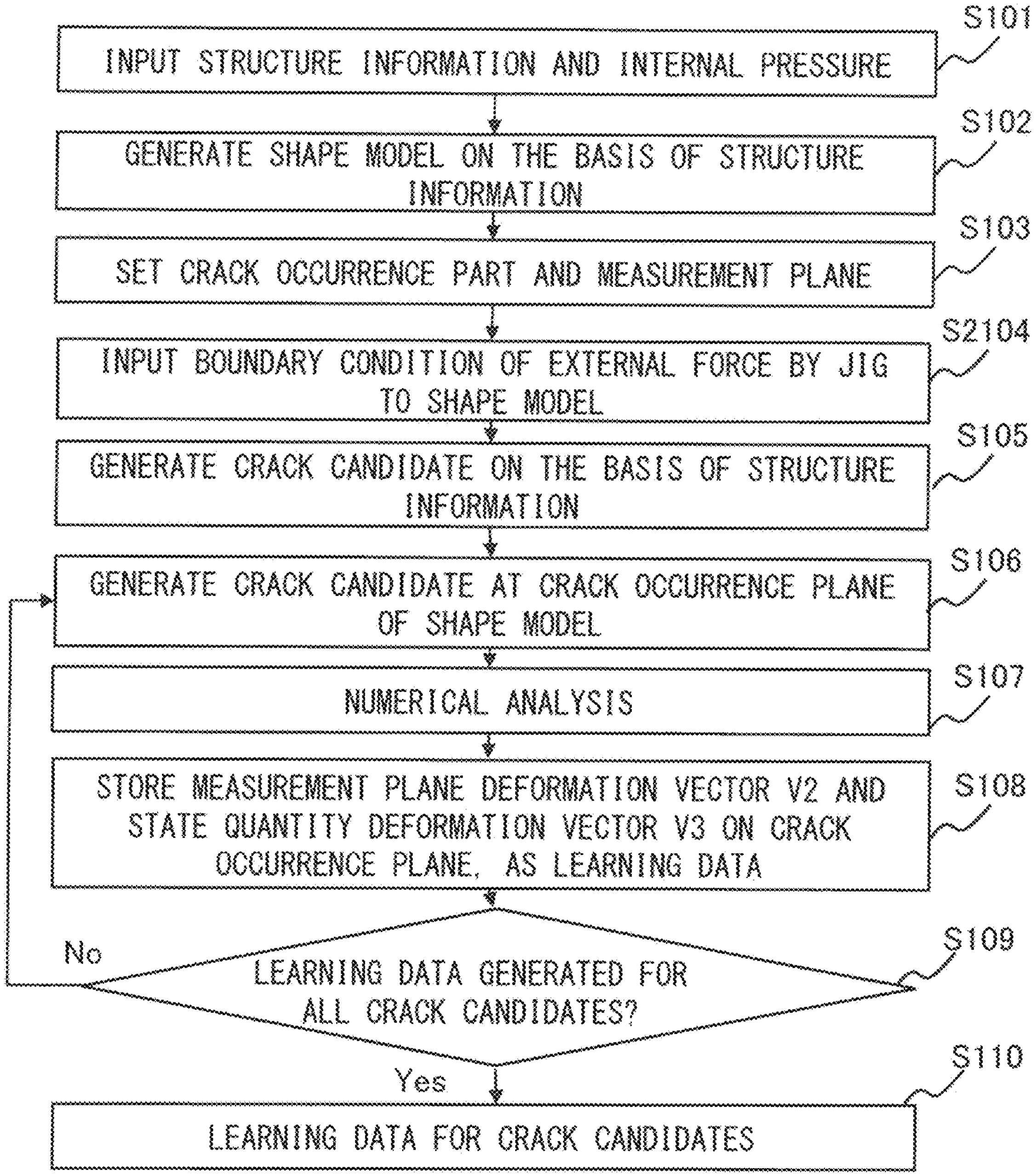
FIG. 18 is a flowchart showing the details of a control process in a model generation unit according to embodiment 2.

FIG. 18 is a flowchart showing the details of control in a case where the model generation unit 10 according to embodiment 2 is configured using numerical analysis.

Figure 19:
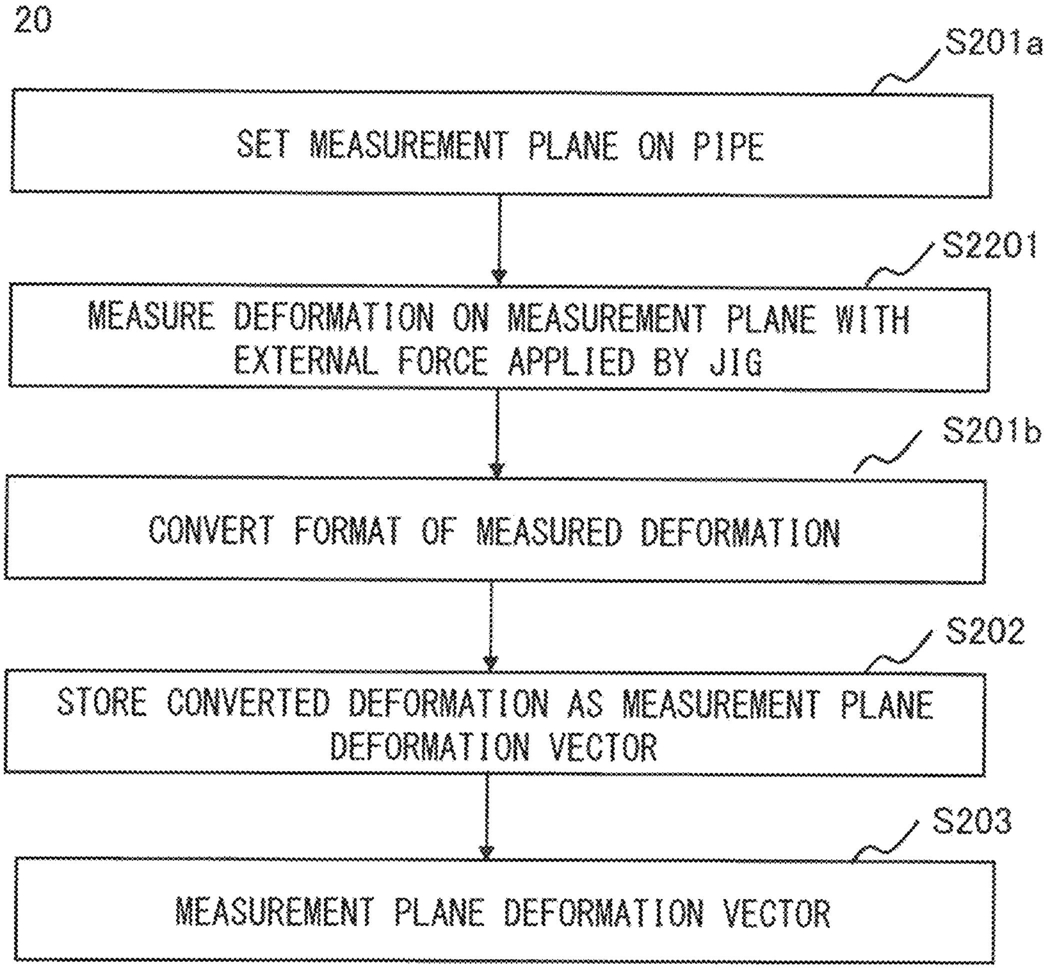
FIG. 19 is a flowchart showing the detailed process in a measurement unit of the crack inspection device according to embodiment 2.

FIG. 19 is a flowchart showing the details of measurement in the measurement unit 20 of the crack inspection device 200 according to the present embodiment 1.

The crack inspection device 200 according to embodiment 2 is provided with a pressure jig 260 for applying a pressure to the outer surface of the pipe 40, as shown in FIG. 17.

In step S2104 shown in FIG. 16 and FIG. 19, the model generation unit 10 imparts, as a boundary condition, second pressure information P2 including information about the magnitude and the direction of an external force applied to the outer surface of the pipe 40, and a support position and a support method of the pressure jig 260 for applying the external pressure, in addition to the first pressure information P1 and the structure information of the pipe 40 as in embodiment 1.

In step S2201 shown in FIG. 16 and FIG. 19, the measurement unit 20 measures deformation on the measurement plane MeaS at the outer surface of the pipe 40, which occurs in accordance with application of the external pressure by the pressure jig 260.

With reference to the structure example of the pipe 40 shown in FIG. 17, deformation on the measurement plane MeaS corresponding to the crack Cra is measured in a state in which support forces S2*a*, S2*b*, S1*a*, S1*b* by support jigs and an external pressure 260P by the pressure jig 260 are applied to the pipe 40. Thereafter, the same control as in embodiment 1 is performed.

In the crack inspection device of the present embodiment configured as described above, a pressure jig for applying a pressure to the outer surface of the pipe is provided, and in the third setting control, the control unit sets, for each of the plurality of kinds of crack candidates, a change on the measurement plane when a crack has occurred at the crack occurrence plane, as the measurement plane estimated change vector, on the basis of the shape model imparted with the boundary condition including second pressure information about the pressure applied to the pipe by the pressure jig.

Thus, the measurement plane estimated change vector based on deformation of the outer surface of the pipe can be set with the crack opened by the pressure jig, whereby estimation accuracy for the learning data corresponding to the size, the position, and the like of the crack can be improved.

Further, since deformation on the measurement plane is measured as the measurement plane deformation vector by the measurement unit after the external pressure is applied to the pipe by the pressure jig, estimation accuracy for the size, the position, and the like of the crack is improved.

Embodiment 3

Hereinafter, embodiment 3 of the present disclosure will be described focusing on difference from the above embodiment 1, with reference to the drawings. The same parts as those in the above embodiment 1 are denoted by the same reference characters and the description thereof is omitted.

Figure 20:
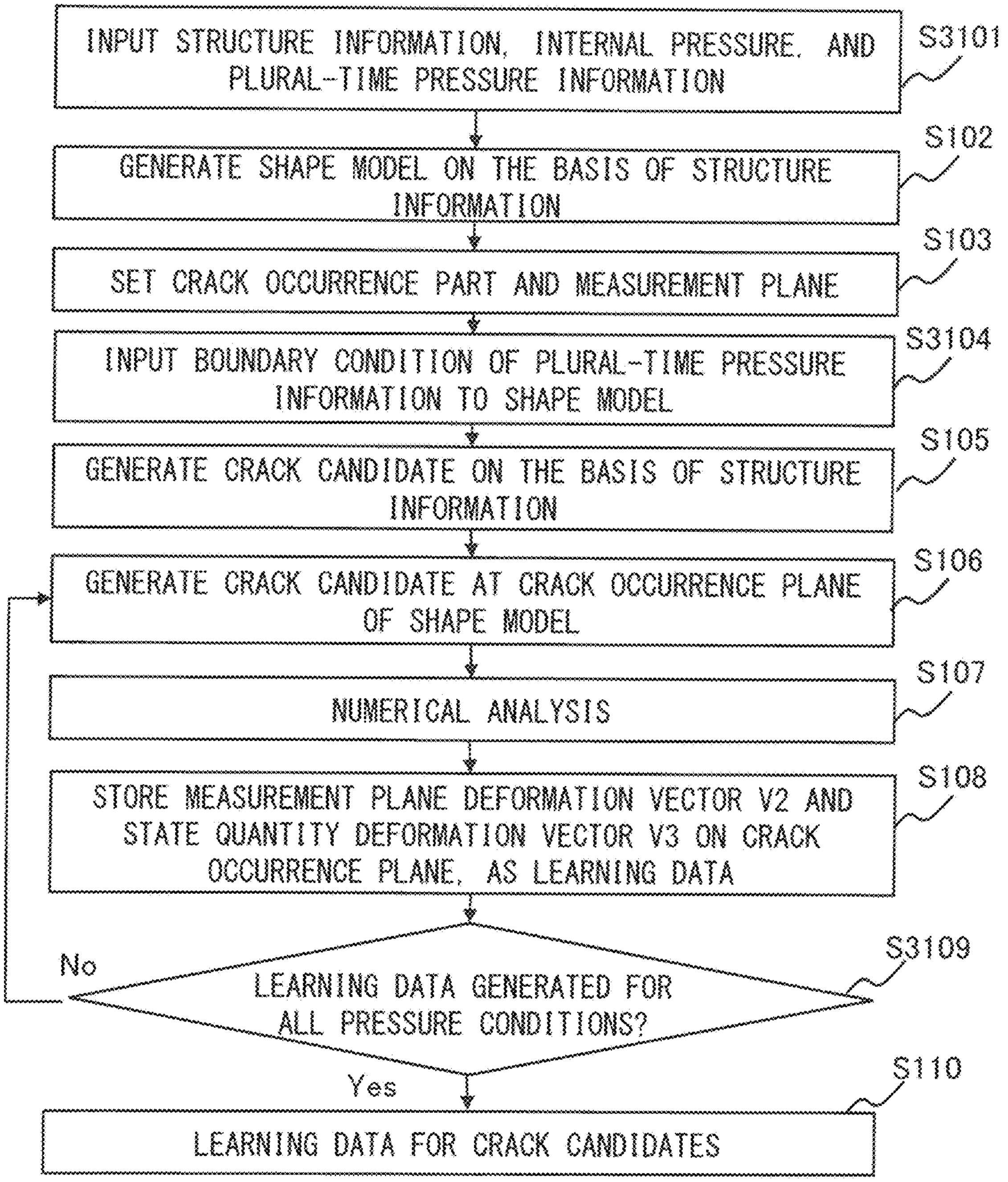
FIG. 20 is a flowchart showing the details of a control process in a model generation unit according to embodiment 3.

FIG. 20 is a flowchart showing the details of control in the model generation unit 10 according to the present embodiment 3.

Figure 21:
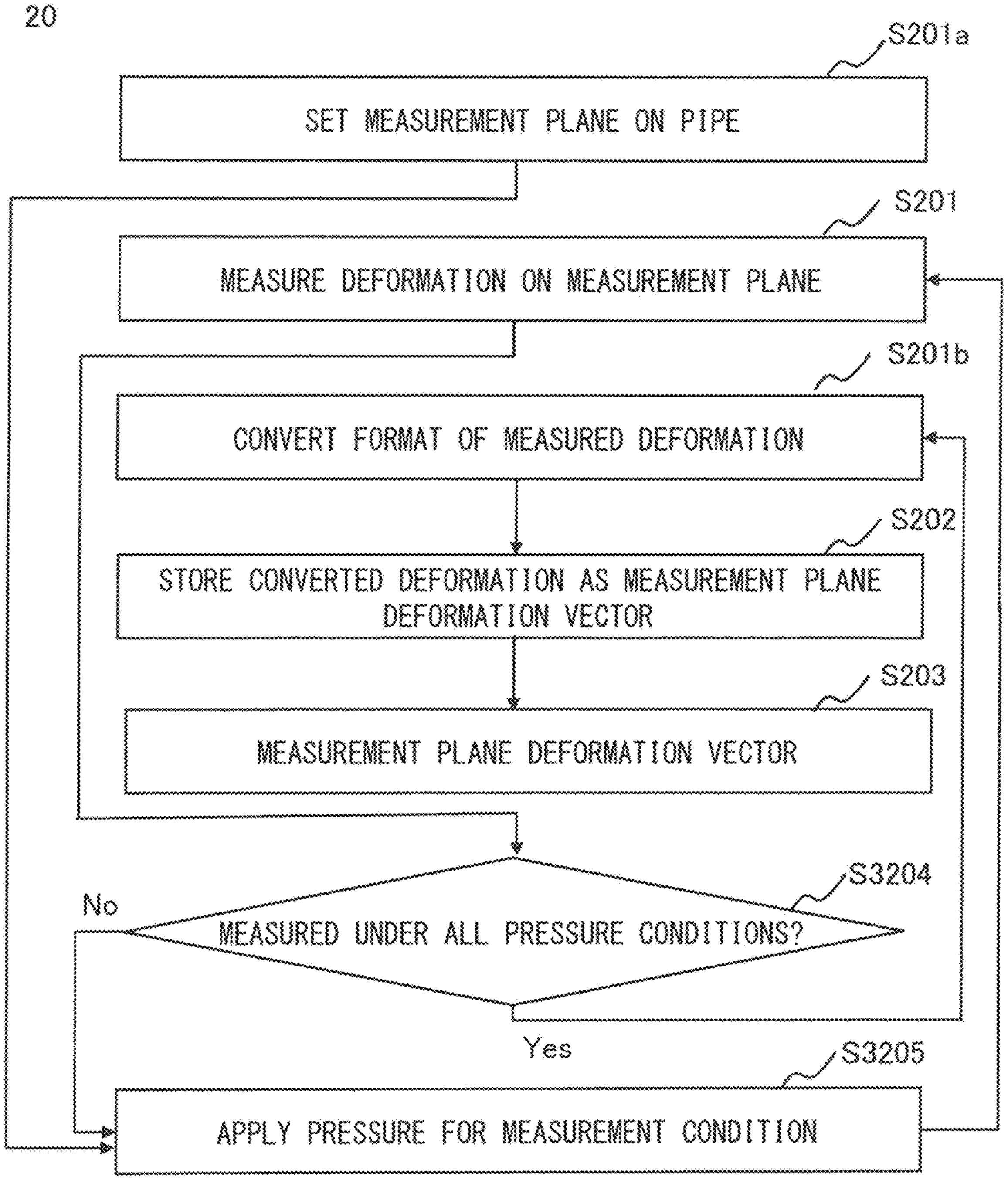
FIG. 21 is a flowchart showing the detailed process in a measurement unit of a crack inspection device according to embodiment 3.

FIG. 21 is a flowchart showing the details of measurement in the measurement unit 20 of the crack inspection device according to the present embodiment 3.

Figure 22:
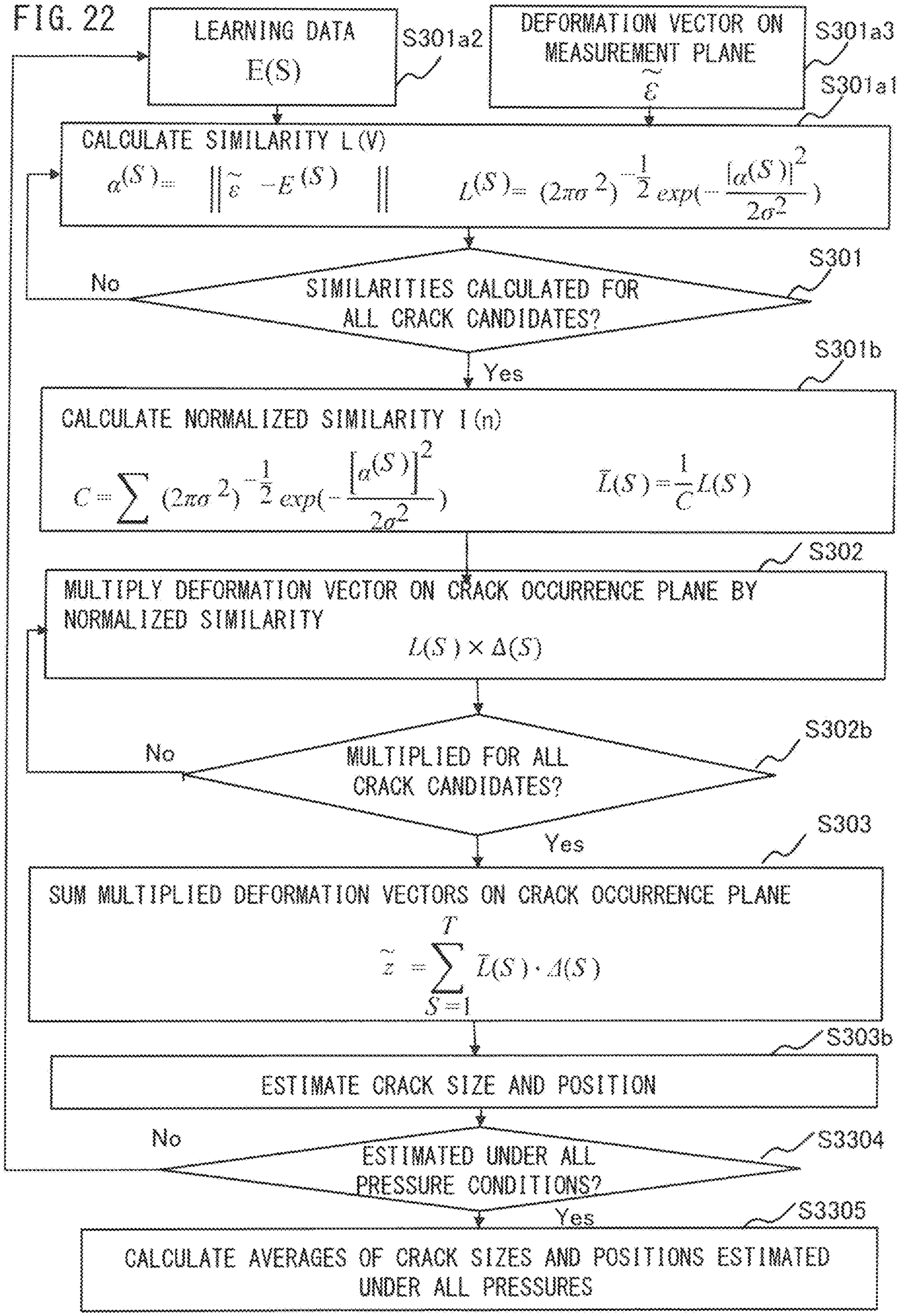
FIG. 22 is a flowchart showing the detailed process in a crack state analysis unit of the crack inspection device according to embodiment 3.

FIG. 22 is a flowchart showing the details of analysis of the crack state analysis unit of the crack inspection device according to embodiment 3.

In the present embodiment, in step S3101 in the model generation unit 10 shown in FIG. 20, a pressure is applied to the pipe 40 a plurality of times on the same or different pressure conditions. Then, the first pressure information P1 or the second pressure information P2 indicating the pressure conditions of a plurality of times of pressure application is inputted.

Thereafter, the same control as in embodiment 1 is performed from step S102 to step S108, and then in step S3109, whether or not learning data have been calculated for all the inputted pressure conditions is determined, and the learning data are outputted in step S110.

Next, in step S3205 subsequent to step S201*a* in the measurement unit 20 shown in FIG. 21, a pressure based on the first pressure information P1 or the second pressure information P2 is applied to the pipe 40. Then, in step S201, deformation of the measurement plane MeaS is measured.

Then, in step S3204, whether or not measurement has been performed for all the pressure conditions set in step S3101 in FIG. 20 is determined, and if measurement has been performed under all the pressure conditions, the process proceeds to step S201*b*, from which the same control as in embodiment 1 is performed subsequently.

In step 203, the measurement plane deformation vectors V2 measured under all the pressure conditions are outputted.

Next, in the detailed flowchart of the crack state analysis unit 30 for analyzing the crack state shown in FIG. 22, the same control as in embodiment 1 is performed from steps S301*a* and 301*a*3 to step S303*b*.

In step S3304, whether or not a crack has been estimated under all the pressure conditions set in step S3101 in FIG. 20 is determined, and if a crack has been estimated under ail the pressure conditions, the process proceeds to step S3305, to output the averages of the sizes and the positions of the crack estimated under all the pressure conditions, as an estimation result.

In the crack inspection device of the present embodiment configured as described above, at least one of the first pressure information or the second pressure information is configured by including such pressure information that a pressure is applied a plurality of times under the same or different pressure conditions. In the third setting control, the control unit sets the measurement plane estimated change vector for each of the pressures applied the plurality of times. In the first estimation control, the control unit estimates a crack occurring at the crack occurrence plane, for each of the pressures applied the plurality of times.

As described above, change in the second pressure information or the first pressure information indicating the same or different external pressures or internal pressures is imparted to the pipe, and the measurement plane estimated change vector which is learning data is set for each of a plurality of times of pressure application. Then, a crack is estimated for each of a plurality of times of pressure application. Thus, since a crack is estimated from results of a plurality of times of measurement with varying pressures, estimation accuracy for a crack is improved.

Embodiment 4

Hereinafter, embodiment 4 of the present disclosure will be described focusing on difference from the above embodiment 1, with reference to the drawings. The same parts as those in the above embodiment 1 are denoted by the same reference characters and the description thereof is omitted.

FIG. 23 is a detailed flowchart of the model generation unit 10 of the crack inspection device for inspecting a crack in a pipe, according to embodiment 4.

In the present embodiment, in step S4101 in the model generation unit 10 shown in FIG. 23, a position tolerance indicating position variation of a support position where the pipe 40 is supported by a structural body such as a jig, and variation of an applied pressure value, are inputted. Thereafter, the same control as in embodiment 1 is performed from step S102 to step S110. Then, in step S4111, whether or not learning data has been generated with a support dimension tolerance and pressure variation reflected in the boundary condition, is determined. When the learning data has been generated, the learning data including the dimension tolerance and the pressure variation is outputted in step S4112.

In the crack inspection device of the present embodiment configured as described above, in the third setting control, the control unit sets, for each of the plurality of kinds of crack candidates, the measurement plane estimated change vector according to a change in a pressure value of the first pressure information or a position tolerance of a support position of the pipe included in the structure information.

As described above, on the basis of variation of the internal pressure applied to the pipe determined depending on a device connected to the pipe or the like and the range of the dimension tolerance of the structural body supporting the pipe, it is possible to set the measurement plane estimated change vector which is learning data in accordance with variation in the internal pressure and the structural body dimensions. Thus, it becomes possible to perform high-accuracy crack estimation in consideration of variation in the pipe support dimensions and the pressure.

Embodiment 5

Hereinafter, embodiment 5 of the present disclosure will be described focusing on difference from the above embodiment 1, with reference to the drawings. The same parts as those in the above embodiment 1 are denoted by the same reference characters and the description thereof is omitted.

Figure 24:
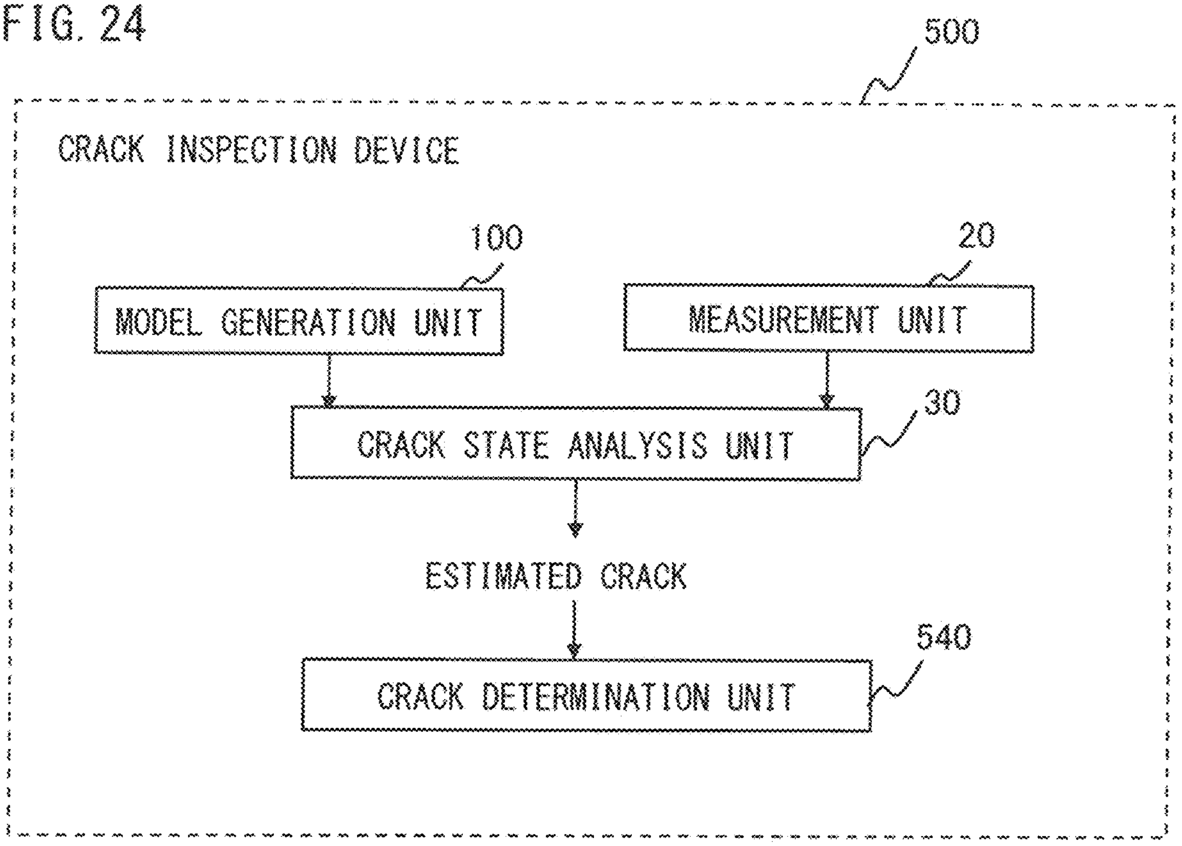
FIG. 24 is a block diagram showing a basic configuration of a crack inspection device according to embodiment 5.

FIG. 24 is a block diagram showing the basic configuration of a crack inspection device 500 according to embodiment 5.

Figure 25:
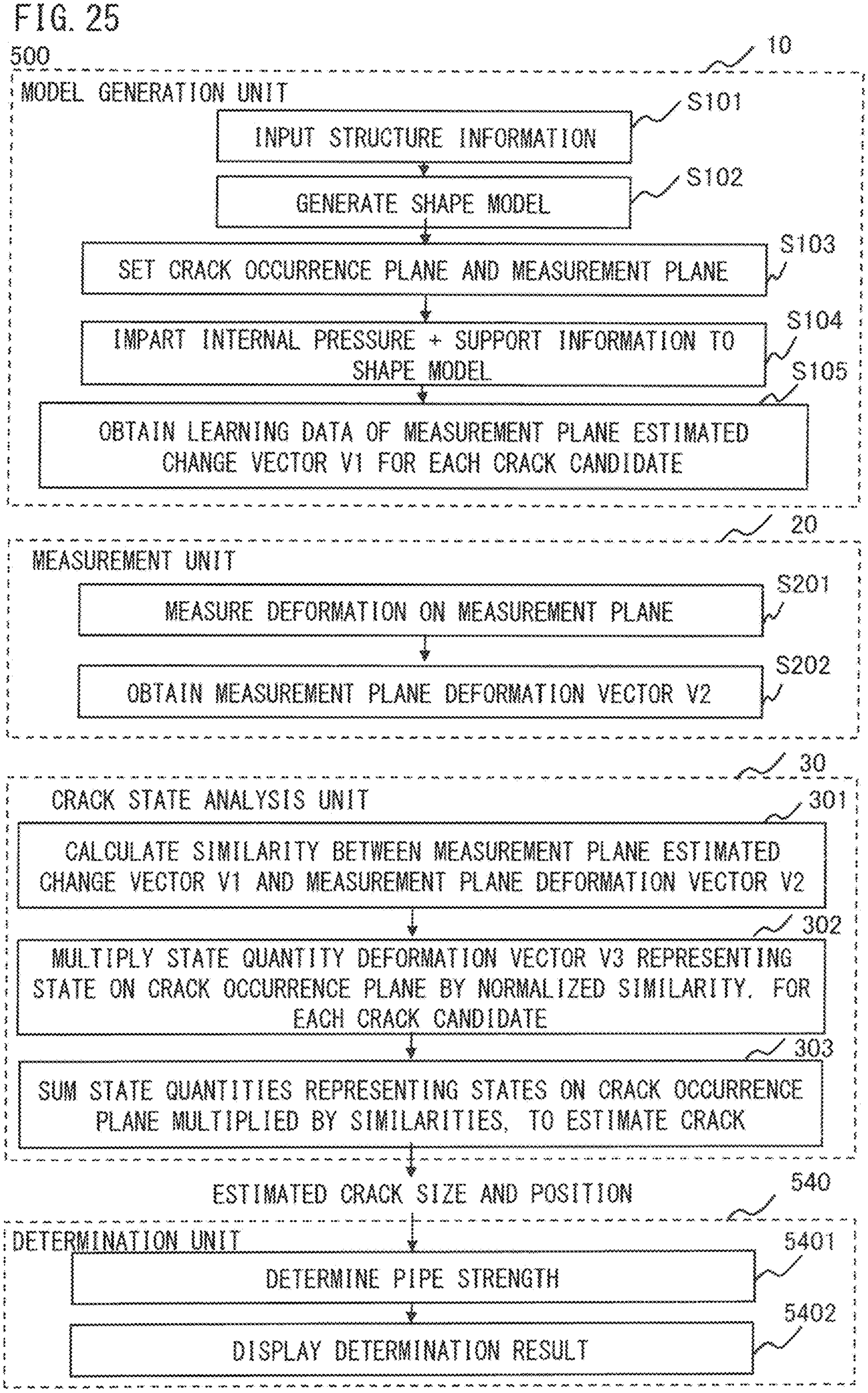
FIG. 25 is a flowchart schematically showing a crack inspection method in the crack inspection device according to embodiment 5.

FIG. 25 is a flowchart schematically snowing a crack inspection method in the crack inspection device 500 according to embodiment 5.

Figure 26:
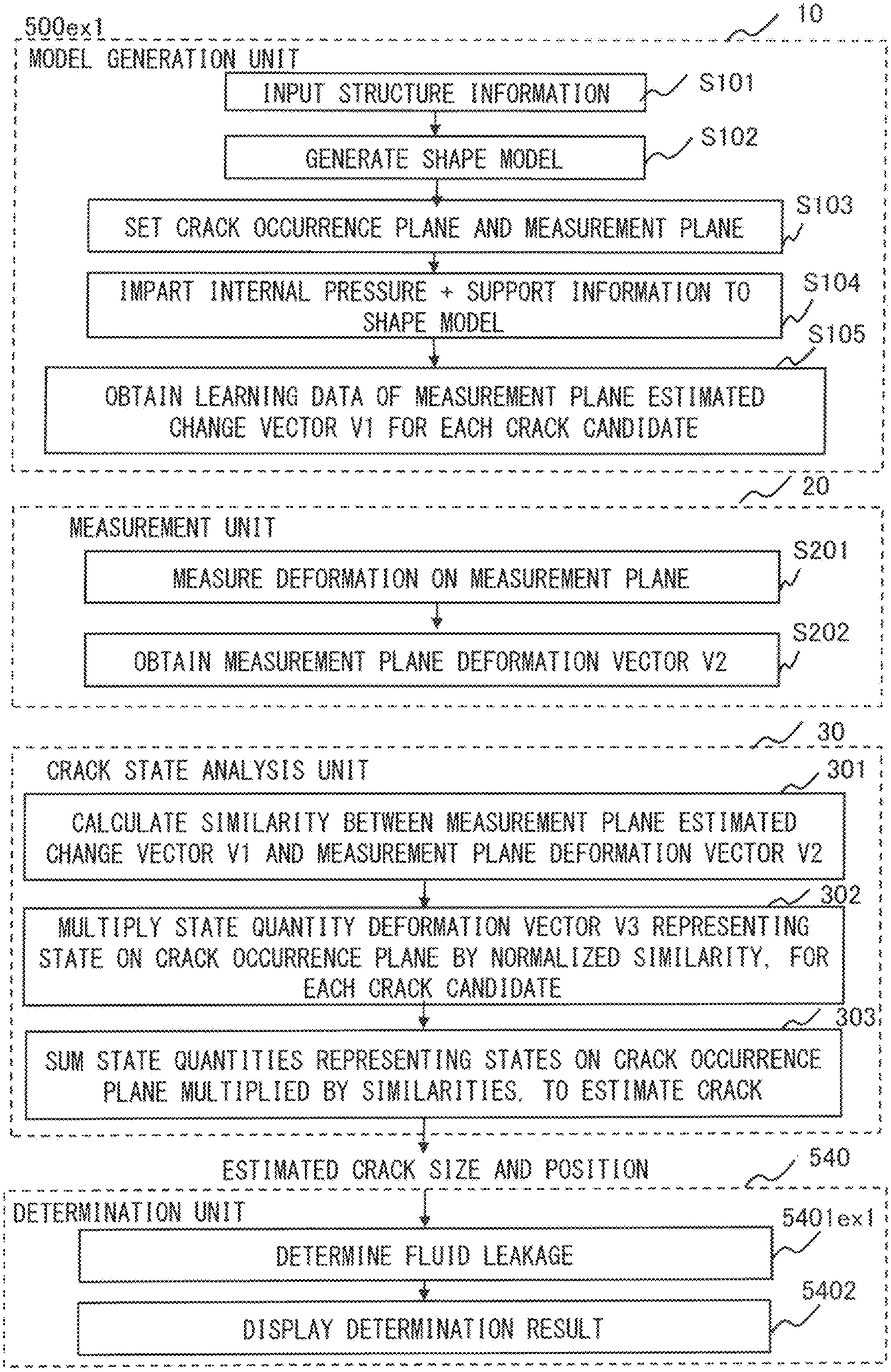
FIG. 26 is a flowchart schematically showing a crack inspection method in the crack inspection device according to embodiment 5.

FIG. 26 is a flowchart schematically showing a crack inspection method in a crack inspection device 500*ex*1 according to embodiment 5, which is different from the crack inspection device 500 shown in FIG. 25.

In the present embodiment 5, as shown in FIG. 24, a crack determination unit 540 as a control unit is provided and performs second estimation control which is state determination for the strength of the pipe 40, progress of a crack, or the like, on the basis of an estimated crack.

First, in step S5401 shown in FIG. 25, on the basis of the size and the position of the crack estimated in step S303, the crack determination unit 540 of the crack inspection device 500 estimates whether or not, due to an excessive load such as an earthquake, the pipe 40 will be broken near the crack, and the estimation result is displayed on a display unit in step S5402.

In step S5401*ex*1 shown in FIG. 26, on the basis of the size and the position of the crack estimated in step S303, the crack determination unit 540 of the crack inspection device 500*ex*1 determines whether or not the fluid inside the pipe 40 will leak, and the estimation result is displayed on a display device or the like in step S5402.

In the crack inspection device of the present embodiment configured as described above, the first pressure information is configured by including repetitive load information about a load repetitively applied to the pipe or maximum load value information about a load applied to the pipe, and the control unit performs second estimation control in which a state of the pipe due to the crack at the crack occurrence plane estimated in the first estimation control is estimated on the basis of the first pressure information.

As described above, the first pressure information is configured by including repetitive load information about a load repetitively applied to the pipe or maximum load value information due to an earthquake applied to the pipe.

Then, the control unit performs the second estimation control in which the state of the pipe due to the crack on the crack occurrence plane estimated in the first estimation control is estimated on the basis of the first pressure information. Thus, as the state of the pipe, leakage of the fluid, breakage of the pipe, or the like is estimated, whereby it is possible to perform efficient repair in a proper order in accordance with the degree of failure of the pipe.

Embodiment 6

Hereinafter, embodiment 6 of the present disclosure will be described focusing on difference from the above embodiment 1, with reference to the drawings. The same parts as those in the above embodiment 1 are denoted by the same reference characters and the description thereof is omitted.

Figure 27:
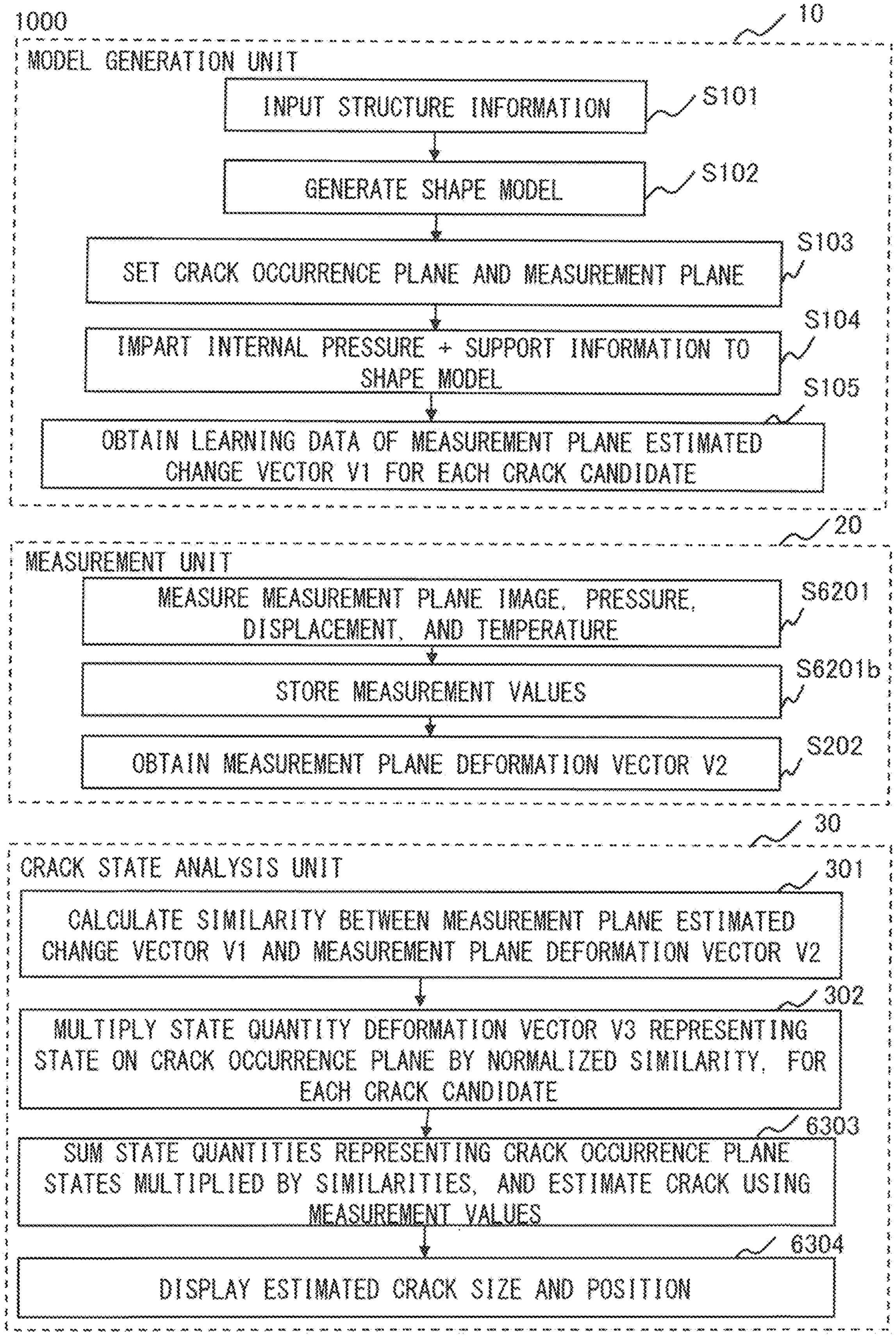
FIG. 27 is a flowchart schematically showing a crack inspection method in a crack inspection system according to embodiment 6.

FIG. 27 is a flowchart schematically showing a crack inspection method in a crack inspection system 1000 including a crack inspection device, according to embodiment 6.

Figure 28:
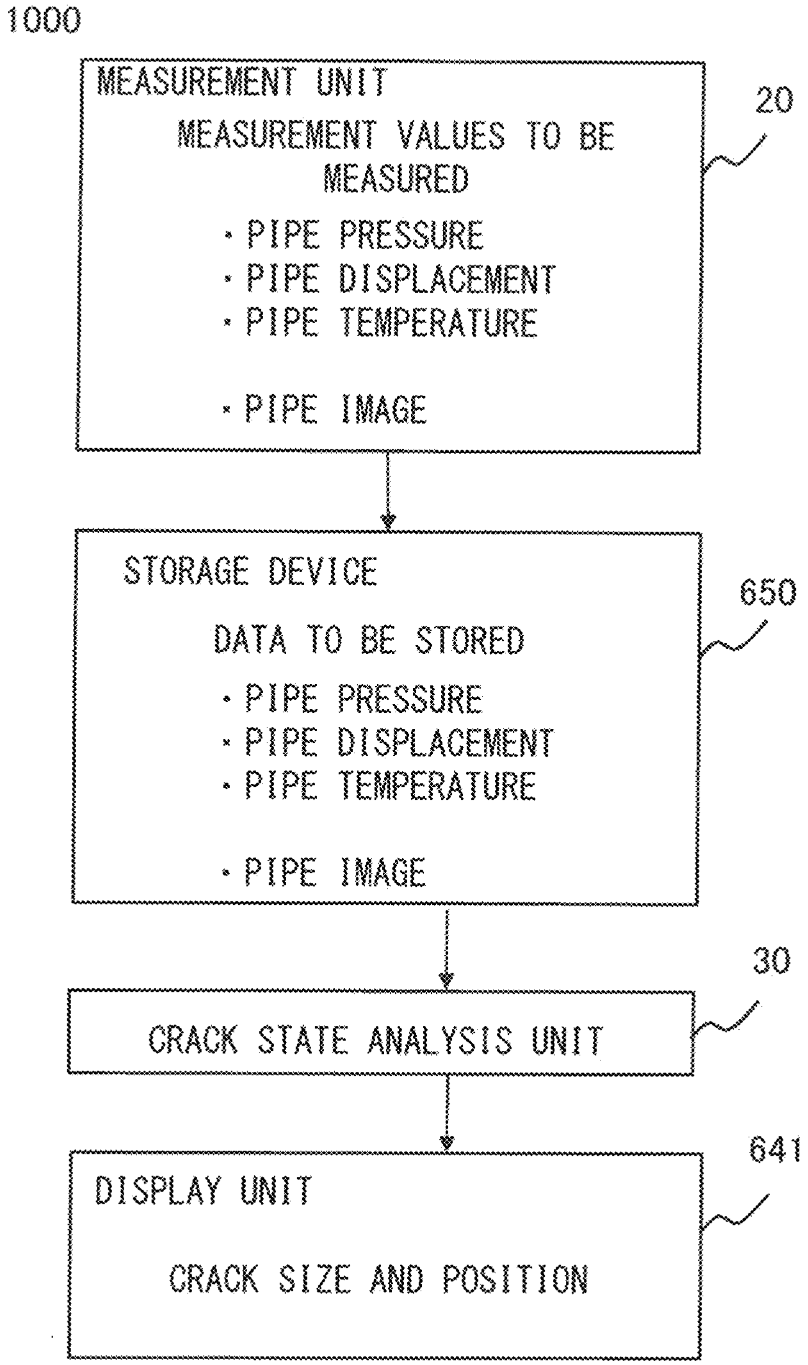
FIG. 28 shows a schematic configuration of a crack inspection system according to embodiment 6.

FIG. 28 shows the schematic configuration of the crack inspection system 1000 including the crack inspection device, according to embodiment C.

As shown in FIG. 28, the crack inspection system 1000 of the present embodiment includes the crack inspection device shown in any of the above embodiments 1 to 5, a storage device 650, and a display device 641 as a display unit for displaying a control result of the control unit of the crack inspection device in FIG. 28, the model generation unit 10 included in the crack inspection device is not shown.

In the crack inspection system 1000, the measurement unit 20 and the storage device 650, the storage device 650 and the crack state analysis unit 30, and the crack state analysis unit 30 and the display device 641, are connected to each other via communication lines or the like.

In step S6201 shown in FIG. 27, the measurement unit 20 acquires, as measurement values, at least one of pressure information, displacement information, and temperature information of the pipe 40, and image information of the outer surface of the pipe 40.

The image information is an image acquired by means such as digital image correlation or the like shown in embodiment 1, and allows a deformation distribution on the outer surface to be acquired using a method for measuring deformation, whereby the measurement plane deformation vector V2 can be derived. Therefore, depending on the method for measuring deformation from an image, there is a case of using two images, i.e., an image at a time when there is no crack or a time when device operation is started, and an image at the time of inspection.

Next, in step S6201*b*, the control unit (not shown) of the measurement unit 20 stores the acquired measurement values in the storage device 650 as a storage unit. Here, the example in which the measurement unit 20 stores the measurement values in the storage device 650 is shown, but the present disclosure is not limited thereto. It suffices that the control unit included in the crack inspection system 1000 performs such storage operation. For example, the crack state analysis unit 30 as a control unit may receive the measurement values transmitted from the measurement unit 20 and store the measurement values in the storage device 650.

Then, the crack state analysis unit 30 estimates a crack on the basis of the measurement values stored in the storage device 650.

The method for estimating a crack is similar to that in embodiment 1, but as shown in step S6303, the crack state analysis unit 30 uses at least one kind of the stored information about pressure, displacement, and temperature of the pipe 40, in the estimation. Thus, it becomes possible to perform high-accuracy crack estimation on the basis of the pressure, displacement, and temperature which have an influence on deformation of the pipe 40. Then, in step S6304, the crack state analysis unit 30 outputs the size of the estimated crack so as to be displayed on the display device 641.

Thus, a worker who performs maintenance work for the pipe can confirm information about the crack estimated accurately as described above, on the display device 641, and thereby can perform appropriate and efficient maintenance work.

The crack inspection system of the present embodiment configured as described above includes: a measurement unit which acquires, as measurement values, image information obtained by capturing deformation on an outer surface of a pipe, and at least one of pressure information about a pressure applied to the pipe, displacement information of the pipe, or temperature information of the pipe; a storage unit which stores the acquired measurement values; a control unit which estimates a crack in an inner surface of the pipe, using a measurement plane deformation vector indicating deformation of the pipe and derived on the basis of the stored image information, and at least one stored measurement value of the pressure information, the displacement information, or the temperature information; and a display unit which displays the crack estimated by the control unit.

As described above, deformation of the pipe due to a crack, which is acquired from an image, and measurement values such as pressure information about a pressure applied to the pipe, displacement information of the pipe, and temperature information of the pipe, which have a great influence on the deformation, are measured, and on the basis of the measurement result, the size and the position of the crack are estimated, whereby the crack can be estimated with high accuracy.

Then, on the basis of information about the high-accuracy estimated crack displayed on the display unit, a worker can perform efficient and appropriate maintenance work.

In addition, the crack inspection system of the present embodiment configured as described above includes: the crack inspection device according to any of the above embodiments; a display unit which displays a result of control performed by the control unit of the crack inspection device; and a storage unit which stores the measurement value from the measurement unit. The measurement unit acquires, as the measurement values, image information obtained by capturing deformation on an outer surface of the pipe, and at least one of pressure information about a pressure applied to the pipe, displacement information of the pipe, or temperature information of the pipe. The control unit stores the acquired measurement values in the storage unit. In the first estimation control, the control unit estimates the crack, using the measurement plane deformation vector of the pipe derived on the basis of the stored image information, and at least one stored measurement value of the pressure information, the displacement information, or the temperature information. The control unit displays the estimated crack on the display unit.

As described above, deformation due to a crack, which is acquired from an image, and a measurement value which is a parameter having a great influence on the deformation, are measured, and the first estimation control for estimating the size and the position of the crack is performed on the basis of the measurement result, whereby a crack can be estimated with high accuracy. Then, on the basis of information about the high-accuracy estimated crack displayed on the display unit, a worker can perform efficient and appropriate maintenance work.

Figure 29:
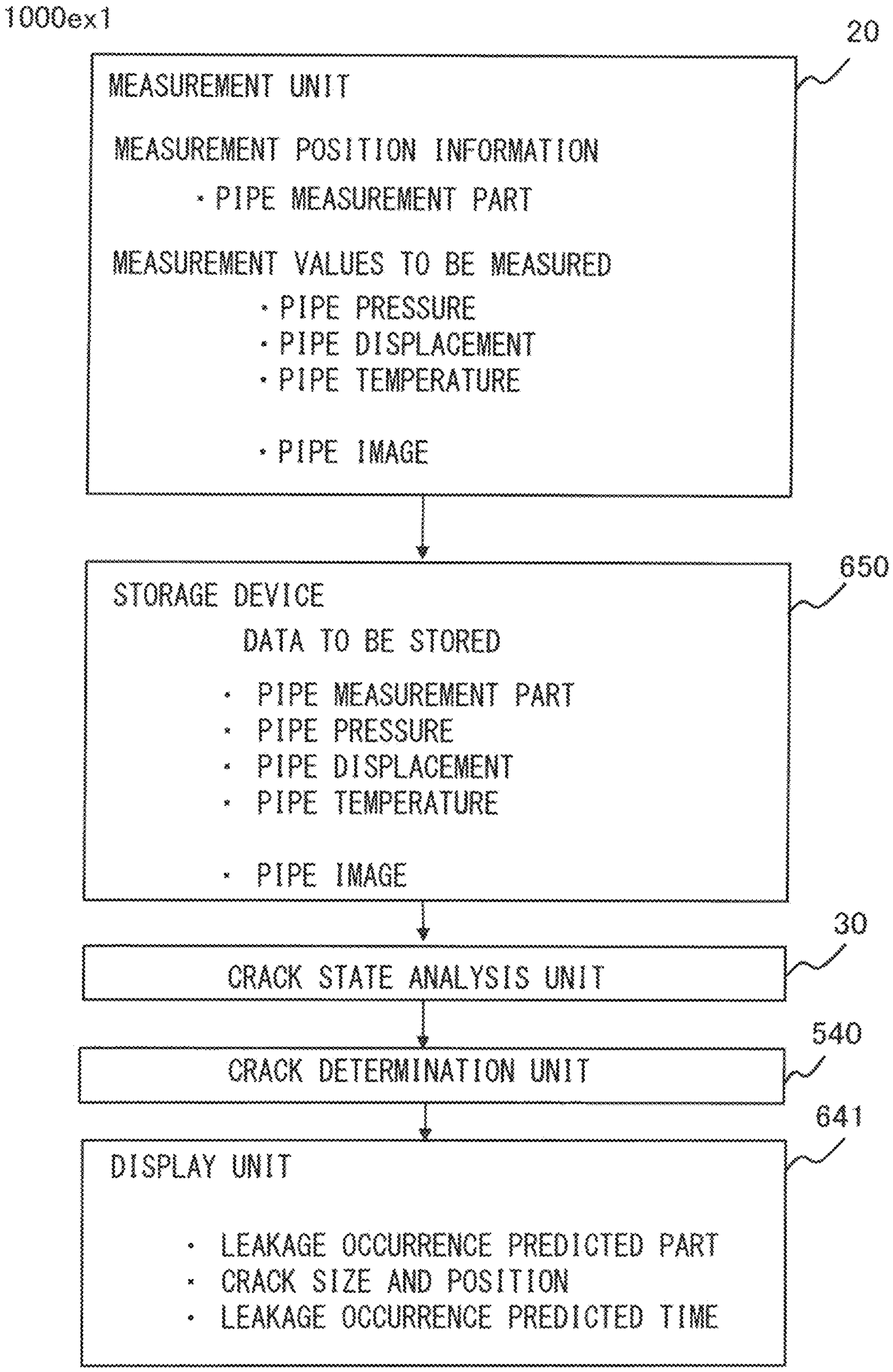
FIG. 29 shows a schematic configuration of a crack inspection system according to embodiment 6.

FIG. 29 shows the schematic configuration of a crack inspection system 1000*ex*1 different from the crack inspection system 1000.

The crack inspection system 1000*ex*1 includes the crack determination unit 540 for performing second estimation control which is state determination for the strength of the pipe 40, progress of a crack, and the like as shown in embodiment 5.

In addition, as in the crack inspection system 1000, the measurement unit 20 of the crack inspection system 1000*ex*1 measures image information of the outer surface of the pipe 40 and at least one of pressure information, displacement information, and temperature information of the pipe 40, and further, measures position information about a measurement part of the pipe 40 where the pressure information, the displacement information, and the temperature information have been measured.

The crack state analysis unit 30 and the crack determination unit 540, and the crack determination unit 540 and the display device 641, are connected to each other via communication lines or the like.

As in the above crack inspection system 1000, the acquired image is an image acquired through digital image correlation or the like, and allows a deformation distribution of the outer surface to be acquired using a method for measuring deformation. Therefore, depending on the method for measuring deformation from an image, there is a case of using two images, i.e., an image at a time when there is no crack or a time when device operation is started, and an image at the time of inspection.

As shown in FIG. 29, the measurement unit 20 stores, in the storage device 650, the measurement values including the measurement part position information, and the image information, in association with an acquisition time when the measurement values have been measured.

Then, on the basis of the measurement values stored in the storage device 650, the crack state analysis unit 30 estimates and outputs a crack for each measurement part position information.

Further, the crack determination unit 540 receives the estimated crack outputted by the crack state analysis unit 30, and performs the second estimation control which is state determination for the strength of the pipe 40, progress of the crack, or the like, on the basis of the estimated crack, as in embodiment 5.

In the second estimation control, the crack determination unit 540 estimates, for each measurement part position information, a leakage occurrence predicted part and a leakage occurrence predicted time as a first time where and when leakage will occur from the cracked pipe while the pipe 40 continues to be used after inspection, and determines whether or not the pipe 40 can be used without leakage until the next inspection or repair time. As a determination result, the crack determination unit 540 displays, on the display device 641, the predicted part where leakage can occur, the size and the position of the estimated crack, and the first time when leakage will occur, in association with each other.

As described above, since the leakage occurrence predicted part and the leakage occurrence predicted time are predicted for each position information about measurement parts of the pipe 40 where the pressure, displacement, and temperature have been measured, it becomes possible to perform accurate prediction in consideration of information about pressure, displacement, and temperature varying among the positions in the pipe 40.

In addition, a worker who performs maintenance work for the pipe can confirm information about the crack, the leakage occurrence predicted part, and the leakage occurrence predicted time, estimated accurately as described above, on the display device 641, and thereby can perform appropriate maintenance work before leakage of the fluid occurs in the pipe 40.

The crack inspection system 1000*ex*1 as described above may be used for periodic inspection, or the crack inspection system 1000*ex*1 may be arranged and operated so as to monitor the states of measurement values and thus may constantly inspect the state of the pipe 40.

In the crack inspection system of the present embodiment configured as described above, the control unit stores measurement position information of the pipe where the at least one measurement value of the pressure information, the displacement information, or the temperature information has been acquired, and the image information, in association with an acquisition time, in the storage unit. The control unit performs second estimation control in which a state of the pipe due to the crack at the crack occurrence plane estimated in the first estimation control is estimated on the basis of the first pressure information. In the first estimation control, the control unit estimates a crack position for each stored measurement position information. In the second estimation control, the control unit estimates crack progress for each stored measurement position information, and estimates a first time when leakage of the fluid from the pipe will occur due to the estimated crack progress. The control unit displays the estimated crack position for each measurement position information and the corresponding first time, on the display unit.

As described above, an occurrence part and an occurrence time of leakage are specified from the estimated crack information, and a part where failure is likely to occur is displayed on the display unit, to notify a worker, whereby the pipe can be repaired efficiently.

Figure 30:
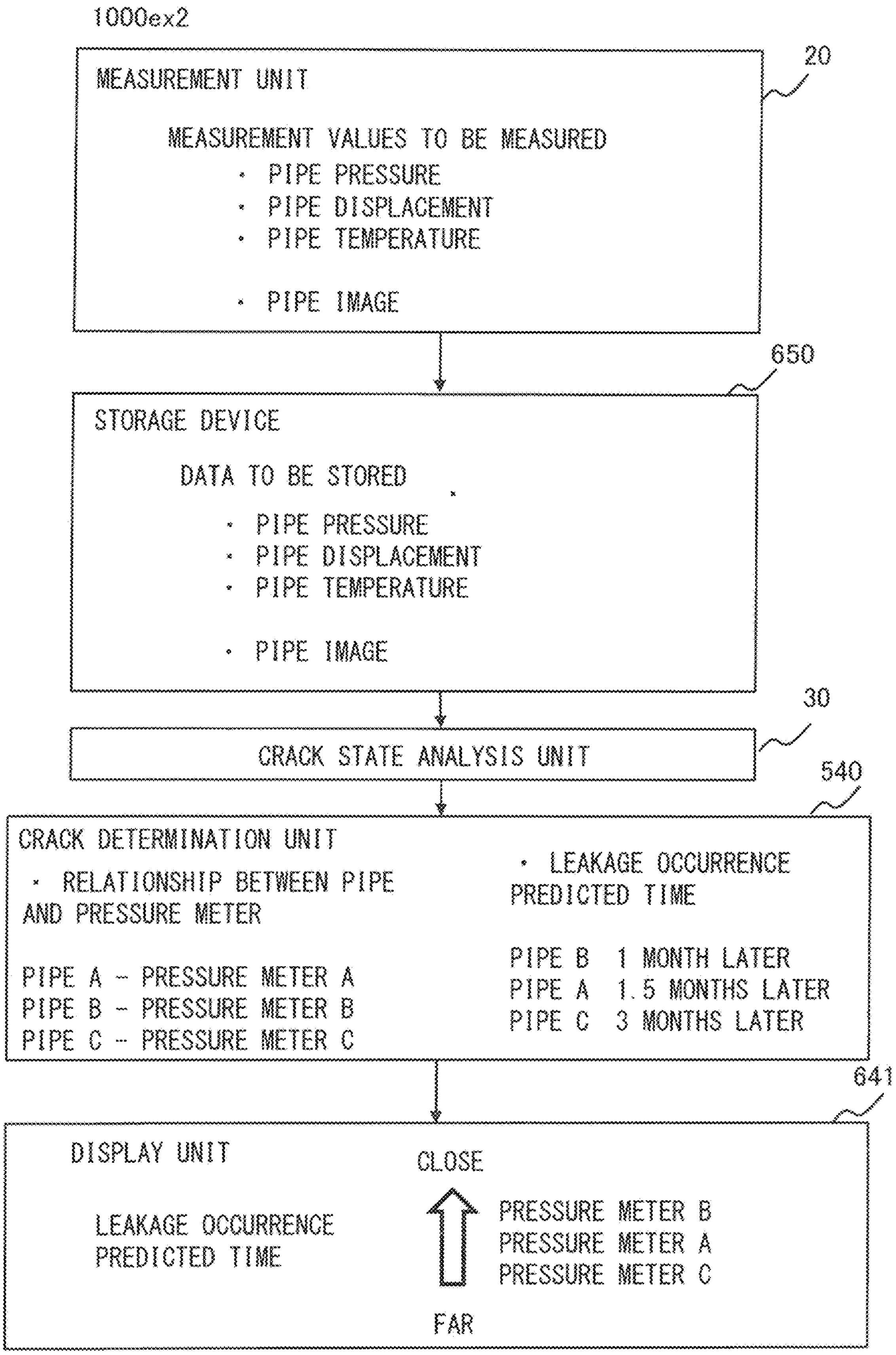
FIG. 30 shows a schematic configuration of a crack inspection system according to embodiment 6.

FIG. 30 shows the schematic configuration of a crack inspection system 1000*ex*2 according to embodiment 6.

As compared to the crack inspection systems 1000, 1000*ex*1, the crack inspection system 1000*ex*2 is partially different in the determination configuration in the crack determination unit 540, as described in detail later.

Measurement values measured by the measurement unit 20 of the crack inspection system 1000*ex*2 are the same as those in the crack inspection system 1000, and include at least one of pressure information, displacement information, and temperature information of the pipe 40, and image information of the outer surface of the pipe 40.

As shown in FIG. 30, the measured measurement values are stored in the storage device 650.

Then, the crack state analysis unit 30 estimates a crack on the basis of the measurement values stored in the storage device 650.

The method for estimating a crack is the same as in embodiment 1, and the crack state analysis unit 30 outputs the size and the position of the estimated crack.

Further, as in the crack inspection system 1000*ex*1, the crack determination unit 540 performs the second estimation control which is state determination for the strength of the pipe 40, progress of the crack, and the like, on the basis of the estimated crack. At this time, the crack determination unit 540 performs the second estimation control for each of a plurality of pipes 40.

In the second estimation control, the crack determination unit 540 estimates a leakage occurrence predicted time as a first time when leakage can occur from the cracked pipe while the pipe 40 continues to be used after inspection, and determines, for each pipe 40, whether or not the pipe 40 can be used without leakage until the next inspection or repair time. As a determination result, the crack determination unit 540 displays, on the display device 641, the pipe 40 where leakage can occur, the size and the position of the estimated crack, and the first time when leakage will occur, in association with each other.

On the basis of the result from the crack determination unit 540, the display device 641 displays any one kind of a pressure meter, a flowmeter, a water level gauge, and an oil level gauge which are second measurement devices performing fluid state monitoring and connected to the pipes 40 for which the first times of occurrence of leakage are coming close, so as to be arranged in the order of times when leakage will occur.

More specifically, as shown in the leakage occurrence predicted time in the determination result, the first time when leakage will occur after inspection is estimated for each of pipes A to C. Then, as shown in a relationship example between pipes A, B, C and pressure meters, pressure meters connected correspondingly to the pipes A to C are displayed. Then, the display order of the pressure meters performing state monitoring are changed to the order from the closest occurrence time of leakage as shown in the display device 641.

In the crack inspection system of the present embodiment configured as described above, the control unit performs the second estimation control with respect to a plurality of the pipes different from each other, to estimate crack progress for each pipe and the first time for each pipe, and the control unit displays the pipes so as to be arranged in a time order of the first times, on the display unit, and displays, in association with the respective pipes, second measurement devices which are connected to the respective pipes and measure states of the fluids sent in the pipes, on the display unit.

As described above, on the display unit, pipes are displayed so as to be arranged in the time order of the leakage occurrence predicted times, and the second measurement devices which are connected to the respective pipes and measure the states of fluids sent in the pipes are displayed, in association with the respective pipes, on the display unit.

Through such control by the crack inspection system, a worker who performs maintenance work for pipes can specify a pipe for which failure is likely to occur, and can easily confirm the second measurement device associated with the pipe. Thus, in a case where an excessive load has occurred due to an earthquake or the like, the worker can immediately confirm the possibility of occurrence of fluid leakage.

In addition, the crack inspection system may control at least one of the pressure or the flow rate of the fluid flowing in the pipe, on the basis of a value obtained from a pressure meter, a flowmeter, a water level gauge, or an oil level gauge as a second measurement device for monitoring the state of the fluid as described above.

Thus, or the basis of a determination result, a pressure or a flow rate in the pipe for which the leakage occurrence time is coming close can be controlled so as to reduce a pressure applied to the pipe, whereby progress of a crack can be suppressed. In this way, the repair times can be controlled, whereby stop periods of an apparatus including the pipe can be decreased.

In the crack inspection system, shape models of a plurality of pipes having shapes different from each other are stored, and position information indicating an actual crack position where a crack occurred in the past may be imparted to each shape model.

In the first estimation control, a part where a crack occurs in the inner surface of the pipe may be specified using the past position information.

Thus, on the basis of the past actual crack parts that occurred in similar pipes, the crack occurrence plane as a candidate plane can be specified, whereby it is possible to anticipate a crack occurrence part while also considering a factor not reflected in the model, so that estimation accuracy is further improved.

In each embodiment, a processing circuit for implementing the estimation device is provided. The processing circuit may be dedicated hardware or a CPU (also referred to as a central processing unit, a central processing device, a processing device, a calculation device, a microprocessor, a microcomputer, a processor, or a DSP) which executes a program stored in a memory.

Figure 31:
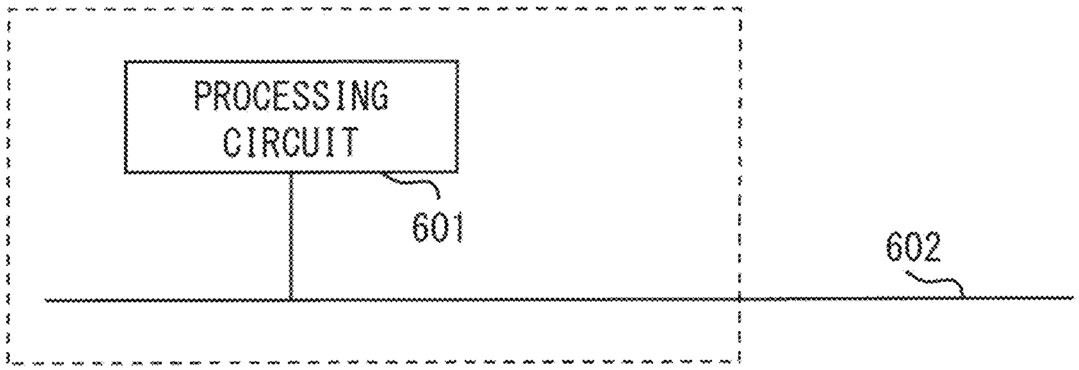
FIG. 31 illustrates a hardware configuration example of the crack inspection device and the crack inspection system according to each embodiment.

FIG. 31 illustrates a hardware configuration example of the crack inspection device and the crack inspection system. In FIG. 31, a processing circuit 601 shown as the control unit of the crack inspection device and the crack inspection system in each of the above embodiments is connected to a bus 602. In a case where the processing circuit 601 is dedicated hardware, the processing circuit 401 is, for example, a single circuit, a complex circuit, a programmed processor, an ASIC, an FPGA, or a combination thereof. The function of each unit of the estimation device may be implemented by the processing circuit 601 or the functions of the units may be collectively implemented by the processing circuit 601.

Figure 32:
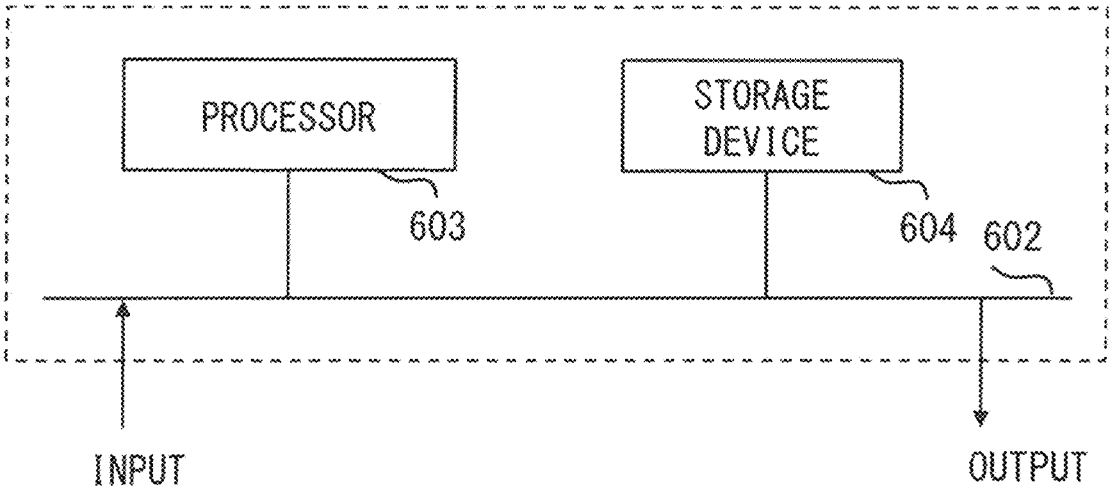
FIG. 32 illustrates a hardware configuration example of the crack inspection device and the crack inspection system according to each embodiment.

FIG. 32 illustrates another hardware configuration example of the crack inspection device and the crack inspection system. In FIG. 32, a processor 603 shown as the control unit of the crack inspection device and the crack inspection system in each of the above embodiments, and a memory 604 as the storage unit, are connected to a bus 602. In a case where the processing circuit is a CPU, the function of each unit of the estimation device is implemented by software, firmware, or a combination of software and firmware. The software or the firmware is described as a program, which is stored in the memory 604. The processing circuit reads and executes the program stored in the memory 604, to implement the function of each unit. That is, the crack inspection device and the crack inspection system each include the memory 604 for storing such a program that, when being executed by the processing circuit, causes the steps to be executed as a result. It can be said that such a program is for causing the computer to execute a procedure or a method to be performed. Here, the memory 404 is a nonvolatile or volatile semiconductor memory such as a random access memory (RAM), a read only memory (ROM), a flash memory, an erasable programmable read only memory (EPROM), or an electrically erasable programmable read only memory (EEPROM), or is a magnetic disk, a flexible disk, an optical disc, a compact disc, a mini disc, a DVD, or the like.

Some of the functions of the crack inspection device and the crack inspection system may be implemented by dedicated hardware and others may be implemented by software or firmware. For example, among the functions, the model generation unit 10 can be implemented by the processing circuit as dedicated hardware. In addition, among the functions, the crack state analysis unit 30 can be implemented by the processing circuit reading and executing the program stored in the memory 604.

As described above, the processing circuit can implement each of the above functions by hardware, software, firmware, or a combination thereof.

In the above embodiments, the example in which the crack occurrence plane CraS or the measurement plane MeaS as a candidate plane is divided into elements in a grid form, has been described. However, the present disclosure is not limited thereto. For example, the crack occurrence plane CraS as a candidate plane or the measurement plane MeaS may be divided into elements in trapezoidal shapes.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

10 model generation unit (control unit)
20 measurement unit
30 crack state analysis unit (control unit)
40 pipe
540 crack determination unit (control unit)
641 display device (display unit)
M shape model

The invention claimed is:

1. A crack inspection device comprising:

measurement circuitry which measures deformation on an outer surface of a pipe for sending a fluid; and controlling circuitry which estimates a crack in an inner surface of the pipe on a basis of a measurement value from the measurement circuitry, wherein the controlling circuitry generates a shape model that models a shape of the pipe, on a basis of structure information indicating a structure of the pipe, on a basis of the shape model, performs first setting control in which a part where a crack occurs in the inner surface of the pipe is specified and an area including the part is set as a crack occurrence plane, and performs second setting control in which an area on the outer surface of the pipe where deformation will occur when a crack has occurred at the crack occurrence plane is specified and the area is set as a measurement plane, on a basis of the shape model imparted with a boundary condition including first pressure information about a pressure applied to the inner surface of the pipe by the fluid, performs third setting control in which a change on the measurement plane when a crack has occurred at the crack occurrence plane is set as a measurement plane estimated change vector, for each of a plurality of kinds of crack candidates, derives deformation on the measurement plane as a measurement plane deformation vector on the basis of the measurement value from the measurement circuitry, calculates a similarity between the derived measurement plane deformation vector and the measurement plane estimated change vector for each crack candidate, and normalizes the similarity, and performs first estimation control in which a crack occurring at the crack occurrence plane is estimated from the normalized similarity and a state quantity deformation vector indicating a deformation state on the crack occurrence plane for each crack candidate.

2. The crack inspection device according to claim 1, wherein:

in the third setting control, the controlling circuitry calculates a displacement in the pipe on a basis of the first pressure information about the pressure applied to the inner surface of the pipe by the fluid, and sets the measurement plane estimated change vector for each of the plurality of kinds of crack candidates, on the basis of the shape model imparted with the displacement as the boundary condition.

3. The crack inspection device according to claim 1, wherein:

in the third setting control, the controlling circuitry sets, for each of the plurality of kinds of crack candidates, the measurement plane estimated change vector according to a change in a pressure value of the first pressure information or a position tolerance of a support position of the pipe included in the structure information.

4. The crack inspection device according to claim 1, wherein:

a pressure jig for applying a pressure to the outer surface of the pipe is provided, and in the third setting control, the controlling circuitry sets, for each of the plurality of kinds of crack candidates, a change on the measurement plane when a crack has occurred at the crack occurrence plane, as the measurement plane estimated change vector, on the basis of the shape model imparted with the boundary condition including second pressure information about the pressure applied to the pipe by the pressure jig.

5. The crack inspection device according to claim 4, wherein:

at least one of the first pressure information or the second pressure information is configured by including such pressure information that a pressure is applied a plurality of times under the same or different pressure conditions, in the third setting control, the controlling circuitry sets the measurement plane estimated change vector for each of the pressures applied the plurality of times, and in the first estimation control, the controlling circuitry estimates a crack occurring at the crack occurrence plane, for each of the pressures applied the plurality of times.

6. The crack inspection device according to claim 1, wherein:

the first pressure information is configured by including repetitive load information about a load repetitively applied to the pipe or maximum load value information about a load applied to the pipe, and the controlling circuitry performs second estimation control in which a state of the pipe due to the crack at the crack occurrence plane estimated in the first estimation control is estimated on a basis of the first pressure information.

7. The crack inspection device according to claim 1, wherein:

the controlling circuitry stores shape models of a plurality of pipes having different shapes, and position information indicating an actual crack position where a crack occurred in past in the pipe is imparted to each shape model, and in the first estimation control, the controlling circuitry specifies a part where a crack occurs in the inner surface of the pipe, using the position information.

8. The crack inspection device according to claim 1, wherein:

in the first setting control, the controlling circuitry specifies a part where a crack occurs in the inner surface of the pipe, using the first pressure information about the pressure applied to the inner surface of the pipe by the fluid.

9. The crack inspection device according to claim 1, wherein:

the measurement circuitry measures deformation on the outer surface of the pipe through digital image correlation, and the controlling circuitry performs image analysis based on the digital image correlation, for the measurement value from the measurement circuitry, to derive the measurement plane deformation vector.

10. The crack inspection device according to claim 1, wherein:

in the first estimation control, the controlling circuitry multiplies the state quantity deformation vector on the crack occurrence plane and the normalized similarity for each of the crack candidates and sums resultant values for all the crack candidates, and then estimates a crack occurring at the crack occurrence plane from a result of the summing.

11. The crack inspection device according to claim 4, wherein:

as the structure information, at least one of an inner diameter of the pipe, an outer diameter thereof, a welding shape thereof, a welding position thereof, or a support method for fixing a set part of the pipe, is set, and as the second pressure information, at least one of a support position, a support method, a pressure value, or a pressure application direction by the pressure jig, is used together with a tolerance indicating variation thereof.

12. A crack inspection system comprising:

the crack inspection device according to claim 1;

a display which displays a result of control performed by the controlling circuitry of the crack inspection device; and a storage which stores the measurement value from the measurement circuitry, wherein the measurement circuitry acquires, as measurement values, image information obtained by capturing deformation on the outer surface of the pipe, and at least one of pressure information about a pressure applied to the pipe, displacement information of the pipe, or temperature information of the pipe, and the controlling circuitry stores the acquired measurement values in the storage, in the first estimation control, estimates the crack, using the measurement plane deformation vector of the pipe derived on a basis of the stored image information, and at least one stored measurement value of the pressure information, the displacement information, or the temperature information, and displays the estimated crack on the display.

13. The crack inspection system according to claim 12, wherein:

the controlling circuitry stores measurement position information of the pipe where the at least one measurement value of the pressure information, the displacement information, or the temperature information has been acquired, and the image information, in association with an acquisition time, in the storage, performs second estimation control in which a state of the pipe due to the crack at the crack occurrence plane estimated in the first estimation control is estimated on a basis of the first pressure information, in the first estimation control, estimates a crack position for each stored measurement position information, in the second estimation control, estimates crack progress for each stored measurement position information, and estimates a first time when leakage of the fluid from the pipe will occur due to the estimated crack progress, and displays the estimated crack position for each measurement position information and the corresponding first time, on the display.

14. The crack inspection system according to claim 13, wherein:

the controlling circuitry performs the second estimation control with respect to a plurality of pipes different from each other, to estimate crack progress for each pipe and the first time for each pipe, and the controlling circuitry displays the pipes to be arranged in a time order of the first times, on the display, and displays, in association with respective pipes, second measurement devices which are connected to the respective pipes and measure states of the fluids sent in the pipes, on the display.

15. The crack inspection system according to claim 13, wherein:

the controlling circuitry controls at least one of the pressure or a flow rate of the fluid flowing in the pipe, on a basis of an estimation result for the crack progress by the second estimation control.

16. A crack inspection method in a crack inspection device including a measurement circuitry which measures deformation on an outer surface of a pipe for sending a fluid, and a controlling circuitry which estimates a crack in an inner surface of the pipe on a basis of a measurement value from the measurement circuitry, the crack inspection method comprising:

a model generation step of generating a shape model that models a shape of the pipe, on a basis of structure information indicating a structure of the pipe;

a step of, on a basis of the shape model, performing first setting control in which a part where a crack occurs in the inner surface of the pipe is specified and an area including the part is set as a crack occurrence plane, and performing a second setting step in which an area on the outer surface of the pipe where deformation will occur when a crack has occurred at the crack occurrence plane is specified and the area is set as a measurement plane;

a third setting step of, on a basis of the shape model imparted with a boundary condition including first pressure information about a pressure applied to the inner surface of the pipe by the fluid, setting a change on the measurement plane when a crack has occurred at the crack occurrence plane, as a measurement plane estimated change vector, for each of a plurality of kinds of crack candidates;

a step of deriving deformation on the measurement plane as a measurement plane deformation vector on the basis of the measurement value from the measurement circuitry, calculating a similarity between the derived measurement plane deformation vector and the measurement plane estimated change vector for each crack candidate, and normalizing the similarity; and a first estimation step of estimating a crack occurring at the crack occurrence plane, from the normalized similarity and a state quantity deformation vector indicating a deformation state on the crack occurrence plane for each crack candidate.

17. The crack inspection device according to claim 2, wherein:

in the third setting control, the controlling circuitry sets, for each of the plurality of kinds of crack candidates, the measurement plane estimated change vector according to a change in a pressure value of the first pressure information or a position tolerance of a support position of the pipe included in the structure information.

18. The crack inspection device according to claim 2, wherein a pressure jig for applying a pressure to the outer surface of the pipe is provided, and in the third setting control, the controlling circuitry sets, for each of the plurality of kinds of crack candidates, a change on the measurement plane when a crack has occurred at the crack occurrence plane, as the measurement plane estimated change vector, on the basis of the shape model imparted with the boundary condition including second pressure information about the pressure applied to the pipe by the pressure jig.

19. The crack inspection device according to claim 3, wherein:

a pressure jig for applying a pressure to the outer surface of the pipe is provided, and in the third setting control, the controlling circuitry sets, for each of the plurality of kinds of crack candidates, a change on the measurement plane when a crack has occurred at the crack occurrence plane, as the measurement plane estimated change vector, on the basis of the shape model imparted with the boundary condition including second pressure information about the pressure applied to the pipe by the pressure jig.

20. The crack inspection device according to claim 17, wherein:

a pressure jig for applying a pressure to the outer surface of the pipe is provided, and in the third setting control, the controlling circuitry sets, for each of the plurality of kinds of crack candidates, a change on the measurement plane when a crack has occurred at the crack occurrence plane, as the measurement plane estimated change vector, on the basis of the shape model imparted with the boundary condition including second pressure information about the pressure applied to the pipe by the pressure jig.

* * * * *